US010127321B2

(12) United States Patent
Aravamudhan et al.

(10) Patent No.: US 10,127,321 B2
(45) Date of Patent: Nov. 13, 2018

(54) PROACTIVE KNOWLEDGE OFFERING SYSTEM AND METHOD

(71) Applicant: Genesys Telecommunications Laboratories, Inc., Daly City, CA (US)

(72) Inventors: Bharath Aravamudhan, Perungudi (IN); Conor McGann, San Carlos, CA (US); Anand Pai Krishnanand Nitin, Foster City, CA (US); Bohdan Klepar, Walnut Creek, CA (US); Andriy V. Ryabchun, Mill Valley, CA (US); Gordon Bell, San Mateo, CA (US); Francisco Gutierrez, San Francisco, CA (US); Josef Eric Eisner, Larkspur, CA (US); Nikolay I. Korolev, Concord, CA (US); Herbert Willi Artur Ristock, Walnut Creek, CA (US); Stanislav Lypachanskyy, Daly City, CA (US)

( * ) Notice: Subject to any disclaimer, the term of this patent is extended or adjusted under 35 U.S.C. 154(b) by 262 days.

(21) Appl. No.: 14/629,481

(22) Filed: Feb. 23, 2015

(65) Prior Publication Data

US 2016/0246885 A1 Aug. 25, 2016

(51) Int. Cl.
*G06F 17/30* (2006.01)

(52) U.S. Cl.
CPC .............. *G06F 17/30867* (2013.01)

(58) Field of Classification Search
CPC .............. G06F 17/30654; G06F 17/30867
See application file for complete search history.

(56) References Cited

U.S. PATENT DOCUMENTS

| 6,631,496 | B1 | 10/2003 | Li et al. |
| 7,577,709 | B1 * | 8/2009 | Kolcz ................. G06K 9/6217 |
| | | | 706/20 |
| 7,774,339 | B2 | 8/2010 | White et al. |
| 8,078,617 | B1 * | 12/2011 | Neveitt ............ G06F 17/30699 |
| | | | 707/732 |
| 8,886,653 | B2 | 11/2014 | Kurabayashi |
| 2003/0088641 | A1 | 5/2003 | Ueno |
| 2009/0106224 | A1 | 4/2009 | Roulland et al. |

(Continued)

FOREIGN PATENT DOCUMENTS

| EP | 3262589 A1 | 1/2018 |
| WO | 2016137903 A1 | 9/2016 |

OTHER PUBLICATIONS

International Search Report and Written Opinion for PCT/US2016/018983, dated May 24, 2016, 17 pages.

(Continued)

*Primary Examiner* — Jorge A Casanova

(57) ABSTRACT

A system and method for proactively making knowledge offers. A processor is configured to gather information on interactions by a user with resources provided by an enterprise having a customer contact center. The processor anticipates need of the user based on the gathered information, and generates a query based on the anticipated need. Prior to the user expressly requesting knowledge relating to a particular topic, the processor proactively identifies and suggests the knowledge to the user based on the generated query. The processor receives feedback relating to the suggested knowledge and outputs based on the feedback, a relevance score for the suggested knowledge.

17 Claims, 16 Drawing Sheets

(56) References Cited

U.S. PATENT DOCUMENTS

| | | | |
|---|---|---|---|
| 2010/0131835 A1 | 5/2010 | Kumar et al. | |
| 2010/0169244 A1* | 7/2010 | Zeljkovic | G06F 17/3071 706/12 |
| 2010/0211558 A1* | 8/2010 | Bonabeau | G06F 17/30864 707/706 |
| 2011/0004588 A1* | 1/2011 | Leitersdorf | G06F 17/30864 707/711 |
| 2011/0004609 A1* | 1/2011 | Chitiveli | G06F 17/30648 707/759 |
| 2011/0069821 A1 | 3/2011 | Korolev et al. | |
| 2011/0264665 A1* | 10/2011 | Mital | G06F 17/30867 707/741 |
| 2011/0271175 A1 | 11/2011 | Lavi et al. | |
| 2013/0046571 A1 | 2/2013 | Tuchman et al. | |
| 2013/0124641 A1 | 5/2013 | Ryabchun et al. | |
| 2013/0159228 A1* | 6/2013 | Meijer | G06F 9/4443 706/14 |
| 2013/0173687 A1* | 7/2013 | Tuchman | G06Q 30/0601 709/202 |
| 2013/0282430 A1 | 10/2013 | Kannan et al. | |
| 2014/0040786 A1 | 2/2014 | Swanson et al. | |
| 2014/0108143 A1 | 4/2014 | Davitz et al. | |
| 2014/0156383 A1 | 6/2014 | Vijayaraghavan et al. | |
| 2014/0222503 A1 | 8/2014 | Vijayaraghavan et al. | |
| 2014/0317120 A1 | 10/2014 | Ghose | |
| 2016/0247165 A1 | 8/2016 | Ryabchun et al. | |

OTHER PUBLICATIONS

Aravamudhan, B., et al., *Integrating Relevance Feedback in the Genesys Knowledge Server for FAQ Retrieval*, Jan. 22, 2015, 10 pages.

Pérez-Agüera, J. R., et al., *Using BM25F for Semantic Search*, WWW2010, Apr. 26-30, 2010, Raleigh, North Carolina, 8 pages.

Patel, S., *6 Predictions About the State of Digital Marketing in 2015*, Forbes, Nov. 5, 2014, retrieve at http://www.forbes.com/sites/sujanpatel/2014/11/05/6-predictions-about-the-state-of-digital-marketing-in-2015, 7 pages.

Crammer, K., et al., *Online Passive-Aggressive Algorithms*, Journal of Machine Learning Research 7, Submitted in May 2005 and Published in Mar. 2006, 35 pages.

Jeon, J., et al., *Finding Similar Questions in Large Question and Answer Archives*, CIKM '05, Oct. 31-Nov. 5, 2005, Bremen Germany, 8 pages.

Liu, T., et al., *LETOR: Benchmark Dataset for Research on Learning to Rank for Information Retrieval*, Proceedings of SIGIR 2007 Workshop on Learning to Rank for Information Retrieval, 2007, 8 pages.

Robertson, S., et al., *Simple BM25 Extension to Multiple Weighted Fields*, CIKM '04, Nov. 8-13, 2004, Washington, DC, 8 pages.

Lucene-java Wiki, *Scores as Percentages*, last edited on Sep. 20, 2009, retrieve at http://wiki.apache.org/lucene-java/ScoresAsPercentages, 3 pages.

Svore, K. M., et al., *A Machine Learning Approach for Improved BM25 Retrieval*, CIKM '09, Nov. 2-6, 2009, Hong Kong, China, 4 pages.

Weinberger, K., et al., *Feature for Large Scale Multitask Learning*, Yahoo! Research, Santa Clara, California, Feb. 27, 2010, 10 pages.

McGann, C., et al., *Semantic Search with Learning*, FAQ Retrieval and Other Applications, Oct. 12, 2014, 10 pages.

Wikipedia, *Okapi BM25*, retrieved at http://en.wikipedia.org/w/index.php?title=Okapi_BM25&oldid=646176876, 4 pages.

Li, H., *A Short Introduction to Learning to Rank*, The Institute of Electronics, Information and Communication Engineers, vol. E94-D, No. 10, Oct. 2011, 9 pages.

Dang, V., et al., *Two-Stage Learning to Rank for Information Retrieval*, Center for Intelligent Information Retrieval, Department of Computer Science, University of Massachusetts Amherst, 2013, 12 pages.

Wikipedia, *Logistic Regression*, retrieved at http://enr.wikipedia.org/wiki/Logistic_regression, 18 pages.

Extended European Search Report for Application No. 16 756 132.3, dated Nov. 8, 2017, 9 pages.

Australian Government IP Australia Examination Report No. 1 for Application No. 2016223022, dated Sep. 3, 2018, 4 pages.

Canadian Intellectual Property Office Action for Application No. 2,979,818, dated Jul. 4, 2018, 4 pages.

\* cited by examiner question: "Is alcohol discounted when I make a reservation using Reserve?"

answer: "The Reserve discount applies to the entire bill, including alcohol, except in certain cities where prohibited. Please carefully review the Fine Print for all applicable restrictions."

| Question | Answer |
|---|---|
| alcohol, american, application, apply, army, command, consider, coupon, create, discount, drink, drug, employ, ethanol, grocery, indian, infantry, lakota, liquor, make, native, payment, prove, render, reservation, reserve, reservist, retail, tribe, use, utilize | alcohol, applicable, apply, bill, certain, city, discount, entire, fine, include, please, print, prohibit, reserve, restriction, review |

FIG. 6B

Home / How to cancel my order

How to cancel my order                    [ × ]    [ Search ]    400    402

Confidence: [ ▼ ]     Date: [    ]

Can I edit or cancel my Goods order?    406
If your purchase was made within the past 2 hours, you can update your shipping address or quantity of your order by going to your My
page and clicking "Edit order" next to this            After 2 hours, we cannot update this information, but ... more

How to cancel a recent purchase
If your order is editable, you'll see "Edit order" next to the          on your My          page. Most orders can be edited at least until midnight on
the day you purchase. NOTE: Orders for           Goods merchandise can only be edited within 2 hours o... more

What happens if I need to cancel my Getaway?
If you've purchased a voucher, you can get a refund for any reason within seven days of purchase. Head to your My           page and click "Edit
order," or contact           Customer Support. After seven days, your purchase is final unless the merchant ... more

[ NO RELEVANT RESULTS ]

Categories

Buying                              Refund policy              Refer-A-Friend and Groupon Bucks
Editing or canceling an order       Ticketed events            Gifts
Shipping                            Booking trips              Restaurant reservations
Using a Groupon

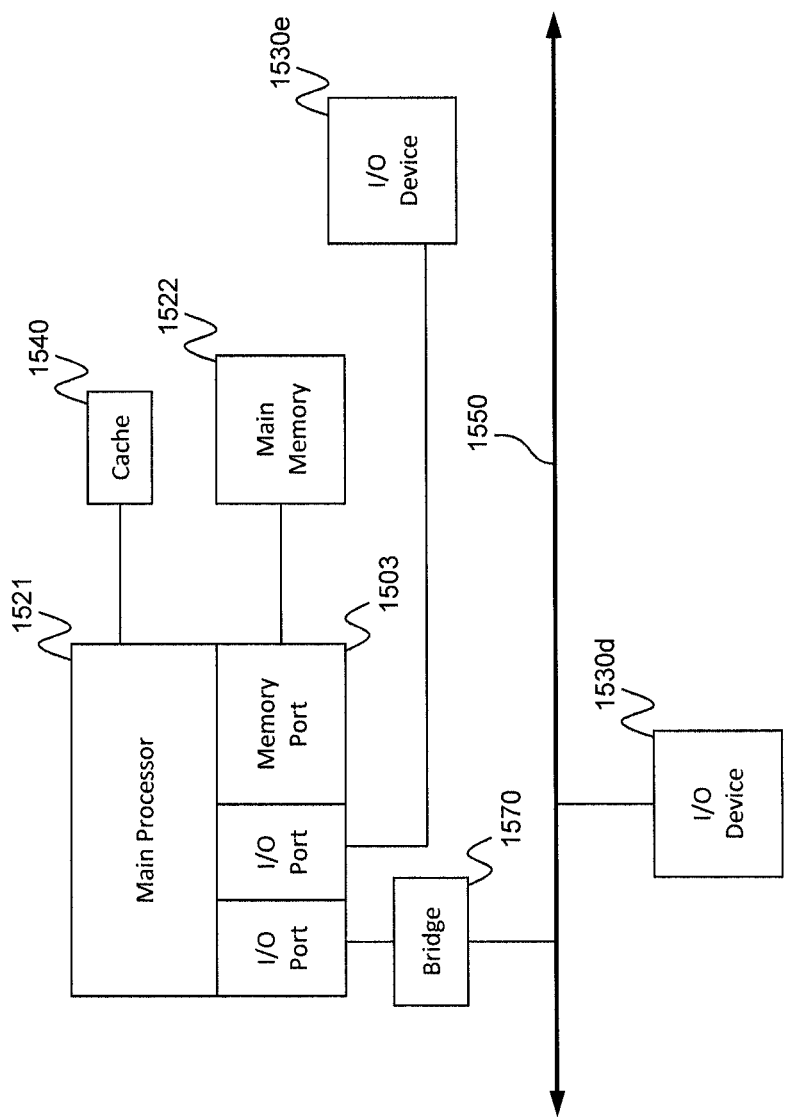

PROACTIVE KNOWLEDGE OFFERING SYSTEM AND METHOD

CROSS-REFERENCE TO RELATED APPLICATION

This application is related to U.S. Application entitled, System and Method for Making Engagement Offers Based on Observed Navigation Path, filed on even date herewith, content of which is incorporated herein by reference.

BACKGROUND

In the field of customer contact centers, it is desirable to have customers engage in self-service as much as possible, such as, for example, by browsing an enterprise's website and finding answers to questions that the customer may have via information provided by the website. This helps deflect calls to the contact center which uses up valuable agent time. Accordingly, it is desirable to provide information to customers as early as possible to allow customers to engage in such self-service.

It is also desirable to extend other offers for engagement to the customer, but such offers should be paced based on availability of resources at the contact center as well as based on likelihood that the customers will accept the offer.

BRIEF SUMMARY

Embodiments of the present invention are directed to a System and method for proactively making a knowledge offer. A processor is configured to gather information on interactions by a user with resources provided by an enterprise having a customer contact center. The processor anticipates need of the user based on the gathered information, and generates a query based on the anticipated need. Prior to the user expressly requesting knowledge relating to a particular topic, the processor proactively identifies and suggests the knowledge to the user based on the generated query. The processor receives feedback relating to the suggested knowledge and outputs based on the feedback, a relevance score for the suggested knowledge.

According to one embodiment, the resources include a website provided by the enterprise.

According to one embodiment, the interaction is a query typed by the user.

According to one embodiment, the resources include agents of the contact center.

According to one embodiment, the interactions include past interactions.

According to one embodiment, the anticipating the need of the user includes anticipating, by the processor an express inquiry from the user.

According to one embodiment, the anticipating the need of the user includes anticipating user intent for a current interaction with one of the resources provided by the enterprise.

According to one embodiment, the query includes text retrieved from the gathered information.

According to one embodiment, the information includes context of the interactions. According to one embodiment, wherein the generating of the query includes identifying b the processor, terms for describing the anticipated need.

According to one embodiment, the processor is further configured to conduct a first level search for a candidate set of knowledge documents based on the knowledge set, and output a first score for each of the documents in the candidate set. The processor is further configured to conduct a second level search of the candidate set of knowledge documents for relevant documents, and output a second score for each of the documents in the candidate set. The processor generates a third score as a function of the first and second scores, and outputs one or more of the documents in the candidate set based on the third score.

According to one embodiment, the processor is further configured to retrieve a classifier model for a particular document in the candidate set. The classifier model includes query samples for which the particular document was tagged as being relevant or not relevant. The processor calculates the second score based on the generated query and the retrieved model. The second score indicates a chance that the generated query is relevant to the particular document.

According to one embodiment, the feedback is for the particular document, and the processor is further configured to train the classifier model for the particular document based on the feedback.

According to one embodiment, the feedback is art express indication by the user as to whether the suggested knowledge was helpful or not.

According to one embodiment, the feedback is implied from actions by the user.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWING

FIG. 6A is a conceptual layout diagram of an exemplary FAQ document that may be stored as a knowledge article according to one embodiment of the invention;

FIG. 6B is a conceptual layout diagram of terms that are extracted from a knowledge document based on a preprocessing step which may be similar to the preprocessing step conducted for input queries according to one embodiment of the invention;

FIGS. 7A-7B are screen shots of a web page providing access to the knowledge management system to a visitor of the website according to one embodiment of the invention;

FIGS. 8A-8B are screen shots of an agent GUI that may be invoked during an interaction with a customer according to one embodiment of the invention;

FIG. 11B is a block diagram of a computing device according to an embodiment of the present invention;

DETAILED DESCRIPTION

Figure 1:
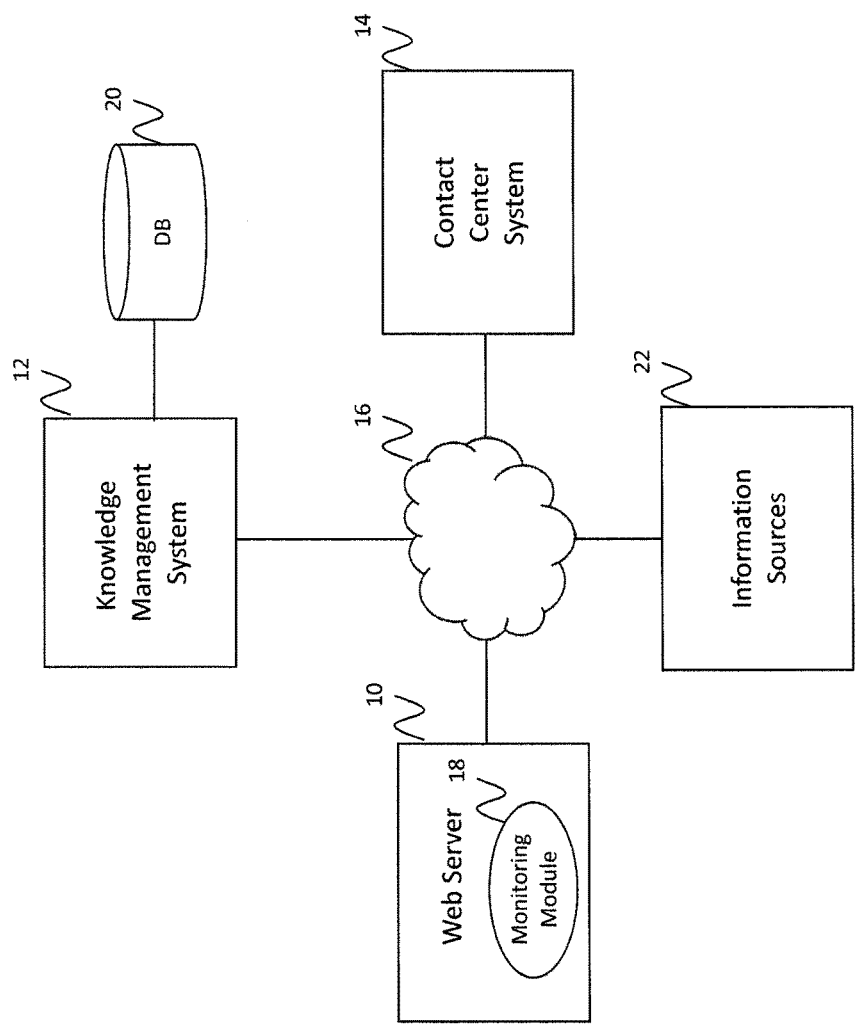
FIG. 1 is a block diagram of a proactive offer management system according to one embodiment of the invention.

Embodiments of the present invention are directed to a system and method for proactively making knowledge offers to users in response to perceived intent, need, or interest (collectively referred to as intent or need) of the users. The users may be, for example, customers of an enterprise browsing the enterprise's website for information. The users may also be agents of a contact center supporting the enterprise. The knowledge offer may be, for example, links to articles, blogs, posts, comments, and the like, identified as relevant in satisfying the perceived need of the user. Although links to knowledge is used as a main example throughout the specification, embodiments f the present invention also contemplate other mechanisms for presenting knowledge to a user, such as, for example, orally, via text messages, via email messages, or via any other multimedia communication conventional in the art.

By proactively offering knowledge to a user, the user need not waste time and effort actively searching for the knowledge or contacting the contact center to receive the knowledge. In one example, a user seeking an answer on what to do with battery problems with his current phone may, while browsing the enterprises website for an answer, automatically have the answer surfaced to him. Such proactive knowledge offers allow users the opportunity for self-service and help deflect calls to the contact center. Also, the ability to quickly anticipate customer intent and offer knowledge in response to the anticipated intent allows problems to be addressed in a quicker manner. Quick resolution to problems helps to increase customer satisfaction.

Embodiments of the present invention are also directed to determining a user's intent as the user navigates pages of an enterprise's website by comparing similar navigation paths followed by other users that exhibited similar intent. Proactive engagement offers/invitations may be made to the user based on the determined intent. The proactive engagement invitations may be, for example, proactive knowledge offers as discussed above that prompt or encourage users to click or otherwise interact with the knowledge offers. The invitations may also be other offers for engagement such as, for example, offers to engage in an interaction with an agent, such as via chat, text, voice, or the like.

Embodiments of the present invention may be exemplified via the following two use cases. For both use cases, embodiments of the present invention try to deduce user intent as early as possible and make a proactive offer in response to the deduced intent.

In a first use case, assume that while a user is filling an email form provided on the enterprises website, the system analyzes content of the form and correlates the content with context surrounding the generating of the form. The context may relate to content of the visited website, how the user got there, the user's profile, engagement and interaction history while browsing the website, social media interactions by the user, current talk-of-the-town, news, public events, and the like. User intent may be deduced based on analysis of the form and context. A confidence level of the deduced intent may be computed for determining whether a matching answer should be proactively offered to the user, such as, for example, prior to the user sending the email. If the computed confidence level satisfies a given threshold, a knowledge offer may be made to the user.

If the knowledge offer satisfies the customer's need, the user may decide to not send the email after all. This helps offload agents from manually processing the email and helps improve user experience by providing a faster response than would otherwise be provided after sending the email request. If the user sends the email anyway because suggested answer was not shown fast enough, the system may be configured to use the identified answer in an automated response email back to the user, or as help for guiding the agent in drafting the response email.

If, however, the response was timely submitted, but the user decides to send the email anyway, an assumption ma be made that the answer did not satisfy the user's need. This information may also be useful in formulating a response back to the user. For example, the system may, in this scenario, disable an automated email response that would otherwise insert the same unsatisfying answer back to the user, and instead, route the email to an agent for generating a manual response. By retrieving and viewing the interaction history of the user as well as knowledge information offered to the user, the agent may understand that the knowledge information was timely displayed to the user and proceed accordingly.

In a second use case, the system is configured to monitor a user's interaction with the enterprise's web site in order to determine user intent. In this regard, the system may be configured to monitor information such as, for example, searches conducted on the website, navigation paths taken while browsing the website, attempts to contact the enterprise on a particular topic, and/or the like. The website interactions may be correlated to context information, such as the context information discussed above, to help determine user intent mote accurately. If the system deduces the user's intent within a certain level of confidence, an engagement invitation is displayed for user selection. The engagement invitation may be, for example, invitation to click on a knowledge document. The engagement invitation may also be an invitation to interact with a live agent, such as, for example, a pop-up message asking "do you want to chat/talk to an agent?" According to one embodiment, the invitations are paced based on the level of confidence of the deduced intent. If the invitations are for live conversations with contact center agents, the invitations are also aligned with the ability of the contact center to actually conduct the conversations. That is, the invitations take into account the probability that the users will accept the invitations (referred to as hit rate logic). According to one embodiment, as soon as user intent is identified, the contact center prepares for an anticipated interaction, such as, for example, by making agent selection, retrieving interaction history for the user, determining a business strategy (matching, offerings, eligibility, cross-/up-sell, etc.), and the like.

FIG. 1 is a block diagram of a proactive offer management system according to one embodiment of the invention. The system includes a web server 10 coupled to a knowledge management system 12 and a contact center system 14 over a data communications network 16. The data communications network 16 may a local area network (LAN) (e.g. a private network such as a company Intranet, a metropolitan area network (MAN), or a wide area network (WAN) (e.g. the Internet), or a combination thereof.

The web server 10 includes hardware and software for storing, processing, and delivering web pages to requesting end user devices. The web pages may be web pages of a website maintained on behalf of a business enterprise which my market products and services to consumers via the website. The web pages may be accessed via, for example, web browser software installed at the end user devices. The end users browse the web pages and get information about the enterprise's products and services. The web pages may also provide a mechanism for contacting the contact center, via, for example, web chat, support forum (whether specific to a certain product or service, or general in nature), voice call, email, web real time communication WebRTC), or the like.

According to one embodiment, the web server 10 hosts a web monitoring module 18 configured to monitor behavior of visitors to the website. Such behavior may include, but is not limited to, material that is being browsed by the visitors, searches being conducted on the website, posts or other knowledge materials that are being accessed by the visitors, navigation path of the visitors, engagement offers provided to the visitors, outcome of the engagement offers, and/or the like. The web monitoring module 18 may also receive information on user actions from social media sites such as Facebook, Twitter, and the like.

The web monitoring module 18 may include tracking code that is embedded in each web page of the website that is being monitored for visitor activity. The tracking code may be, for example, a Java Script code. In other embodiments where Flash Web pages are provided, the tracking code may also be an Action Script. According to one embodiment, the script defines what type of activity is being monitored, such as, for example, access of site features, navigation on web pages and between web pages, search activity, and any interaction with product ads, price comparison widgets, electronic shopping tools, electronic forms, and the like.

According to one embodiment, the enterprise for which the website is maintained is also supported by a customer contact center. The customer contact center may serve the enterprise in performing the functions of sales and service relative to the products and services available through the enterprise and via the website. According to one exemplary embodiment, the contact center system 14 provides the necessary software and hardware (e.g. computers, telecommunication equipment, and other infrastructure) that enables the contact center to deliver services to customers via telephone or other communication mechanisms. Such services may vary depending on the type of contact center, and may range from customer service to help desk, emergency response, telemarketing, order taking, and the like. The contact center system 14 may be located in-house to the enterprise, hosted in equipment provided by a third-party service provider, or deployed in equipment provided in a remote computing environment such as, for example, a private or public cloud environment.

According to one embodiment, the web server 10 and contact center system 14 provide interaction information and context surrounding the interactions to the knowledge management system 12. The knowledge management system 12 may use this information to determine user intent and provide knowledge articles or other offers for engagement based on the determined intent. The knowledge management system 12 may determine a user's intent by correlating user actions during a given session, accessing user's history, and considering other influential parameters. The knowledge management system 12 may also serve the knowledge in accordance to the determined intent.

The context information may relate to a navigation path followed by the user as the user surfs the web pages provided by the web server, a history of prior engagements and interactions, user profile information, current news, social media postings, and/or the like. According to one embodiment, the knowledge management system proactively makes an offer for engagement based on deduced user intent, preferably before the user makes an express request for the engagement. Of course, the offer for engagement may also be in response to an express request made by the user, such as, for example, an express search query submitted by the user, a request made during a chat session with a contact center agent, or an email Web form submitted by the user.

According to one embodiment, the offer for engagement provided by the knowledge management system 12 may be an offer for chat, call back, or the like. The offer for engagement may also be an offer of a knowledge article identified by the knowledge management system based on deduced need. In this regard, the knowledge management system is coupled to a mass storage device 20 that provides a general and/or domain-specific knowledge base (also referred to as corpus) for indexing by the system 12. The knowledge documents forming the knowledge base are dynamic by nature. That is, if the knowledge document becomes obsolete, it is replaced by updates.

According to one embodiment, the knowledge management system 12 also has access to different information sources 22 over the data communication network 16 that may be used to deduce/anticipate user intent and proactively make engagement offers relevant to the deduced intent. The information sources 22 may include, but are not limited to, social media sites, news information sites, traffic/weather sites, advertisement campaigns, event information sites, reputation management systems, and the like.

In the embodiment of FIG. 1, the web server 10, knowledge management system 12, and contact center system 14 are depicted as being separate servers/systems. A person of skill in the art should recognize, however, that the functionality of one or more of the servers/systems may be integrated together into a single server/system or further subdivided into sub-systems/servers without departing from the spirit of the invention. For example, the functionality of the knowledge management system 12 may be integrated into the monitoring module 18 of the web server 10, or integrated into the contact center system 14, as will be appreciated by a person of skill in the art.

Figure 2:
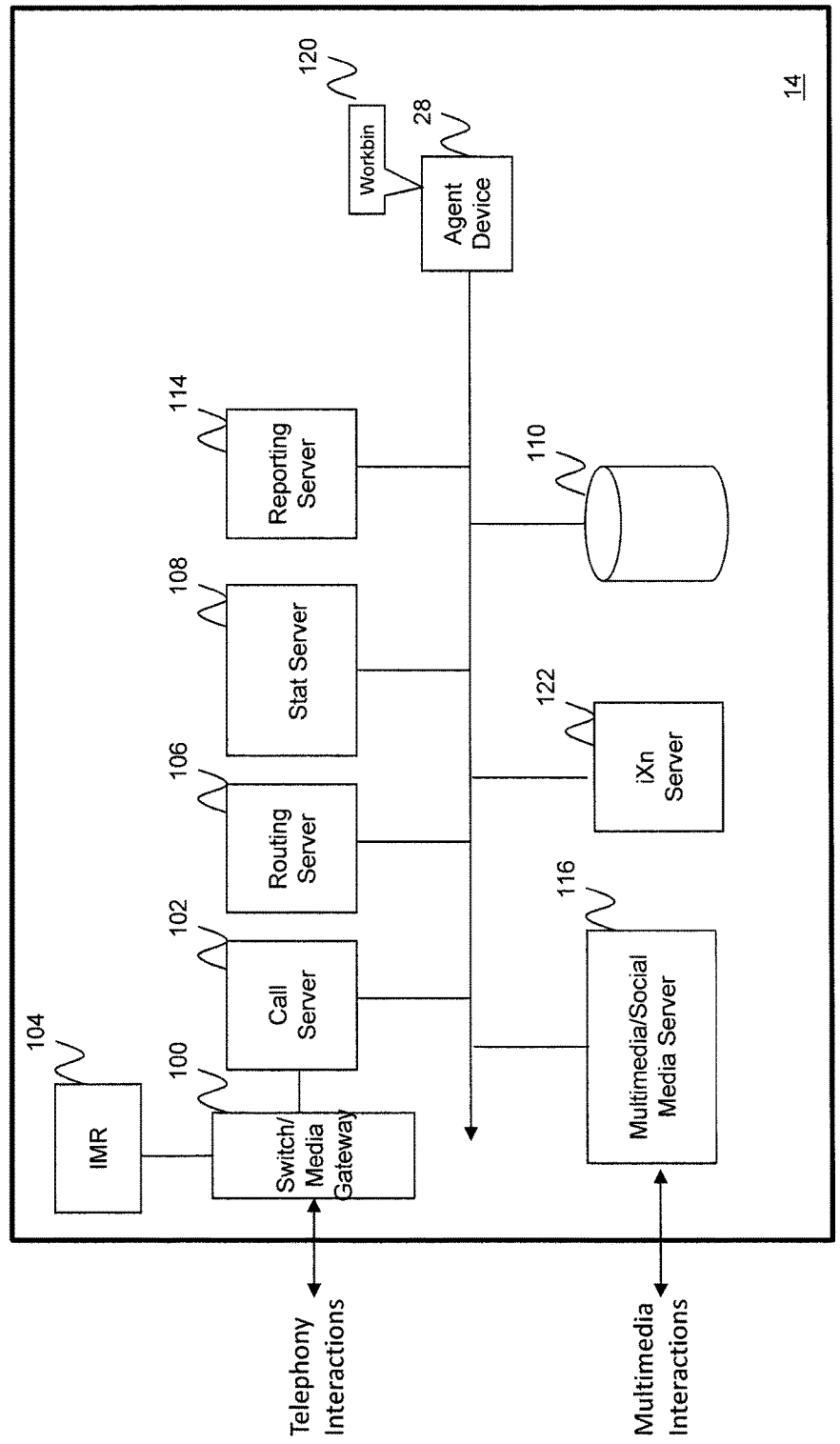
FIG. 2 is a block diagram of a contact center system according to one embodiment of the invention.

FIG. 2 is a more detailed block diagram of the contact center system 14 according to one embodiment of the invention. According to one exemplary embodiment, the system 14 includes a switch/media gateway 100 coupled to a communications network, such as, for example, a PSTN network or the communications network 16 of FIG. 1, for receiving and transmitting telephony calls between customers and the contact center. The switch/media gateway 100 may include a telephony switch configured to function as a central switch for agent level routing within the center. In this regard, the switch 100 may include an automatic call distributor, a private branch exchange (PBX), an IP-based software switch, and/or any other switch configured to receive Internet-sourced calls and/or telephone network-sourced calls. According to one exemplary embodiment of the invention, the switch is coupled to a call server 102 which may, for example, serve as an adapter or interface between the switch and the remainder of the routing, monitoring, and other call-handling components of the contact center.

The call server 102 may be configured to process PSTN calls, VoIP calls, and the like. For example, the call server 102 may include a session initiation protocol (SIP) server for processing SIP calls. According to some exemplary embodiments, the call server 102 may, for example, extract data about the customer interaction such as the caller's telephone number, often known as the automatic number identification (ANI) number, or the customer's internet protocol (IP) address, or email address, and communicate with other contact center components in processing the call.

According to one exemplary embodiment of the invention, the contact center system 14 further includes an interactive media response (IMR) server 104, which may also be referred to as a self-help system, virtual assistant, or the like. The IMR server 104 may be similar to an interactive voice response (IVR) server, except that the IMR server is not restricted to voice, but may cover a variety of media channels including voice. Taking voice as an example, however, the IMR server may be configured with an IMR script for querying calling customers on their needs. For example, a contact center for a bank may tell callers, via the IMR script, to "press 1" if they wish to get an account balance. If this is the case, through continued interaction with the IMR customers may complete service without needing to speak with an agent. The IMR server 104 may also ask an open ended question such as, for example, "How can I help you?" and the customer may speak or otherwise enter a reason for contacting the contact center.

The routing server 106 may be configured to take appropriate action for processing a call. For example, the routing server 106 may use data about the call to determine how the call should be routed. If the call is to be routed to a contact center agent, the routing server 106 may select an agent for routing the call based, for example, on a routing strategy employed by the routing server 106, and further based on information about agent availability, skills, and other routing, parameters provided, for example, by a statistics server 108.

In some embodiments, the routing server 106 may query a customer database, which stores information about existing clients, such as contact information, service level agreement (SLA) requirements, nature of previous customer contacts and actions taken by contact center to resolve any customer issues, and the like. The database may be, for example, Cassandra or any non-SQL database, and may be stored in a mass storage device 30. The database may also be a SQL database an may be managed by any database management system such as, for example, Oracle, IBM DB2, Microsoft SQL server, Microsoft Access, PostgreSQL, MySQL, FoxPro, and SQLite. The routing server 20 may query the customer information from the customer database via an ANI or any other information collected by the IMR server 34.

Upon identification of an agent to whom to route the call, a connection is made between the caller and an agent device of an identified agent, such as, for example, the agent device 28 of FIG. 2. Received information about the caller and/or the caller's historical information may also be provided to the agent device for aiding the agent in better servicing the call. In this regard, the agent device 28 may include a telephone adapted for regular telephone VoIP calls, and the like. The agent device 28 may also include a computer for communicating with one or more servers of the contact center system 14 and performing data processing associated with contact center operations, and for interfacing with customers via voice and other multimedia communication mechanisms.

According to one embodiment, the agent device 28 is configured with a graphical user interface (GUI) for interfacing with the knowledge management system 12. The agent GUI may provide a history of queries and answers provided b the knowledge management server 12 for a particular customer with whom the agent is now interacting. The agent GUI may also allow an agent to submit queries for receiving suggestions of knowledge documents that may be helpful to the agent while interacting with the customer. The knowledge documents retrieved fir use by the agent may also be based on deduced intent of the customer.

The suggested knowledge documents may include information that are approved for exposing to the customer, or information on what not to expose to the customer. For example, assuming that the deduced intent of the customer is that be wants to cancel service, and the interaction is transferred to a skilled agent or supervisor trying to preserve the business relationship, the retrieved knowledge document may be information on how to preserve the business relationship and not information to guide the customer in canceling the service. In another example, the knowledge document may be to provide guidance on how to respond to a customer question (e.g. customer question about bending, of smartphones sold by the enterprise). Knowledge documents exposed to agents may also be subject of confidentiality (e.g., only agents with certain confidentiality clearance may have access), or subject to authorization (e.g. certain agent might be authorized to offer particular services while others are not). In this regard, the knowledge management system may be configured to retrieve profile data of the agents prior to suggesting knowledge documents that have been tagged with confidentiality levels and/or authorization levels.

The contact center system 14 further includes a reporting server 114 configured to generate reports from data aggregated by the statistics server 108. Such reports may include near real-time reports or historical reports concerning the state of resources, such as, for example, average waiting time, abandonment rate, agent occupancy, and the like. The reports may be generated automatically or in response to specific requests from a requestor (e.g., agent/administrator, contact center application, and/or the like).

The contact center system 14 may also include a multimedia/social media server 116 for engaging in media interactions other than voice interactions with end user devices and the web server 10. The media interactions may be related, for example, to email, vmail (voice mail through email), chat, video, text-messaging, web, social media (whether entirely within the domain of the enterprise or that which is monitored but is outside the proprietary enterprise domain), co-browsing, and the like.

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an interaction (iXn) server 122 interacts with the routing server 106 for selecting an appropriate agent to handle the activity. Once assigned to an agent the activity may be pushed to the agent, or may appear in the agent's workbin 120 as a task to be completed by the agent. The agent's workbin may be implemented via any data structure conventional in the art, such as, for example, a linked list, array, and/or the like. The workbin may be maintained, for example. In buffer memory of the agent device 28.

According to one exemplary embodiment of the invention, the mass storage device(s) 110 may store one or more databases relating to agent data (e.g. agent profiles, schedules, etc.), customer data (e.g. customer profiles), interaction data (e.g. details of each interaction with a customer, including reason for the interaction, disposition data, time on hold, handle time etc.), and the like. According to one embodiment, some of the data (e.g. customer profile data) may be maintained in a customer relations management (CRM) database hosted in the mass storage device 110 or elsewhere. The mass storage device may take form of a hard disk or disk array as is conventional in the art.

According to one embodiment, the knowledge management system 12 is a client of the mass storage device(s) 110 that receives information stored in the mass storage device(s), such as, for example, engagement and interaction history data, user profile data, and the like. Such data may be provided to the knowledge management system 12 on a periodic basis and/or in response to a request for such data from the knowledge management system 12.

I. Proactive Knowledge Offers

Figure 3:
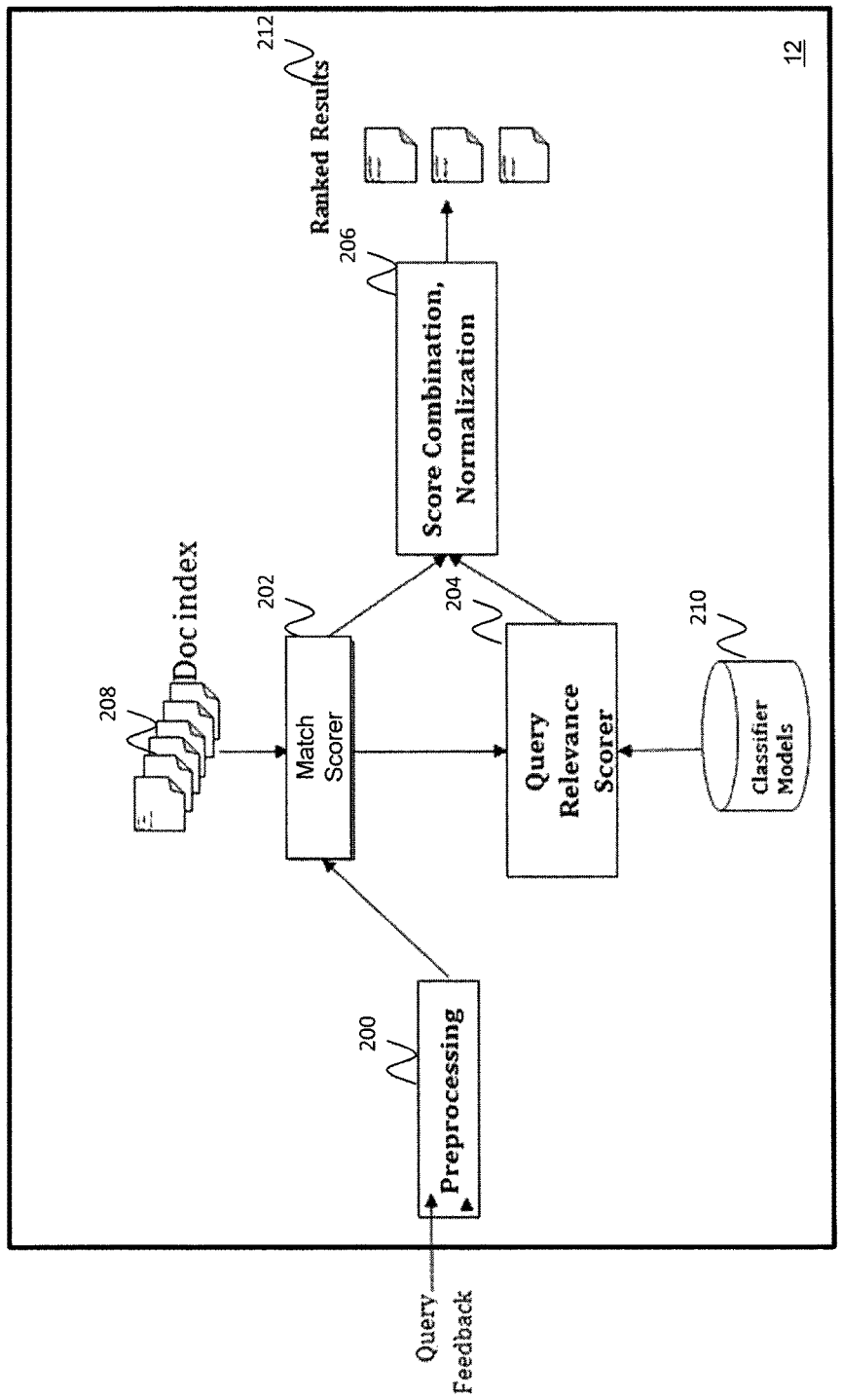
FIG. 3 is a block diagram of a knowledge management system according to one embodiment of the invention.

FIG. 3 is a more detailed block diagram of the knowledge management system 12 according to one embodiment of the invention. The system includes a preprocessing module 200 coupled to a match scoring module 202 which in turn is coupled to a query relevance scoring module 204. According to one embodiment, the preprocessing, module 200 is configured to receive an initial query from, for example, the web monitoring module 18, and transform the query as needed to generate an updated query. The initial query may be, for example, a natural language text that is input by a user on a web page provided by the web server. According to one embodiment, the query is submitted to the preprocessing module 200 even before the user has taken action to expressly submit the query. In this regard, when a threshold amount of text (which may be judged based on content) is entered by the user, an assumption is made that the user will eventually ask the question.

In addition or in lieu of the text typed by the user, the initial query may also include keywords generated by the web monitoring module 18 based on, for example, contextual data. Such contextual data may relate to content of the website being browsed by the user, the navigation path that led the user to the current web page, user identification information, and/or the like. According to one embodiment, the preprocessing module 200 may be configured to process the initial query to identify useful terms and expand on those terms to generate a list of topics that relate to user intent. According to one embodiment, the preprocessing module 200 may retrieve additional context data from the contact center system 14 and/or other information sources 22 to expand the query based on the context data.

The match scoring module 202 is configured to take the updated/transformed query and match the query against a set of indexed, documents 208 stored, for example, in the mass storage device 20. Although the term document is used as a general term to refer to knowledge that is stored in the mass storage device, a person of skill in the art should recognize that knowledge may be any type of information to be conveyed to a user, such as, for example, articles, answers to frequently asked questions (FAQs), blogs on expert sites, social media postings, and the like. According to one embodiment, the scoring module 202 may be implemented as a search engine that computes a degree of similarity between the updated query and various fields of documents stored in the mass storage device. The scoring module 202 assigns a match score based on the computed degree of similarity. The documents are then ranked based on their match scores. The matching documents output b the match scoring module may be bound at an upper limit preset by the knowledge management system 12.

The query relevance scoring module 204 is configured to take the match results from the match scoring module 202 and score each of the match results against a trained document model that is maintained for the particular document. In this regard, the knowledge management system 12 maintains a binary classifier model in a model database 210, for each indexed document 208. There are benefits of maintaining a per-document classifier, as opposed to a global classifier. For example, the per-document approach allows the classification problem to be modeled with a smaller and denser feature space. Also, the collision rate for incremental learning is generally smaller when there are many classifiers, and each is trained quickly. Documents may also be added and deleted from the knowledge base without affecting the classification of other documents already in the knowledge base.

The model is trained based on feedbacks received from users relating to relevancy of the document to the user's intent, after the document has been suggested to the user. If the document is tagged by a user as being relevant, the query that caused the document to be suggested becomes a positive sample for the classifier. If the document is tagged as not being relevant, the query becomes a negative sample for the classifier. The tagging may be explicit as well as implicit as discussed in further detail below. Over time, each of the per-document classifiers is trained with positive and negative samples from user feedbacks. Then, given a new query, each classifier may predict the chances of the new query being relevant to the document.

According to one embodiment, the knowledge management system 12 further includes a score combination module 206 that is configured to take, for a candidate document, the match score output by the match scoring module 202 and the relevance score output by the query relevance scoring module 204, and generates a combined score that is a function for the two scores. The combined score may be normalized to be within a fixed interval range like [0.0, 1.0]. According to one embodiment, the normalized score is treated as a value that reflects confidence that the knowledge document will satisfy the user's need. The documents are ranked by score and output as ranked results 212. According to one embodiment, documents that have a confidence less than a preset confidence level are dropped from the result set. According to one embodiment, a knowledge lifecycle (if available for a particular document) is taken into account in determining, whether a document should be kept or dropped from the result set. For example, if an answer is past its knowledge lifecycle and hence, obsolete, it is deleted from the result set. In some embodiments, the check for lifecycle information may also be performed by the match scoring module 202 or query relevance scoring module.

Figure 4:
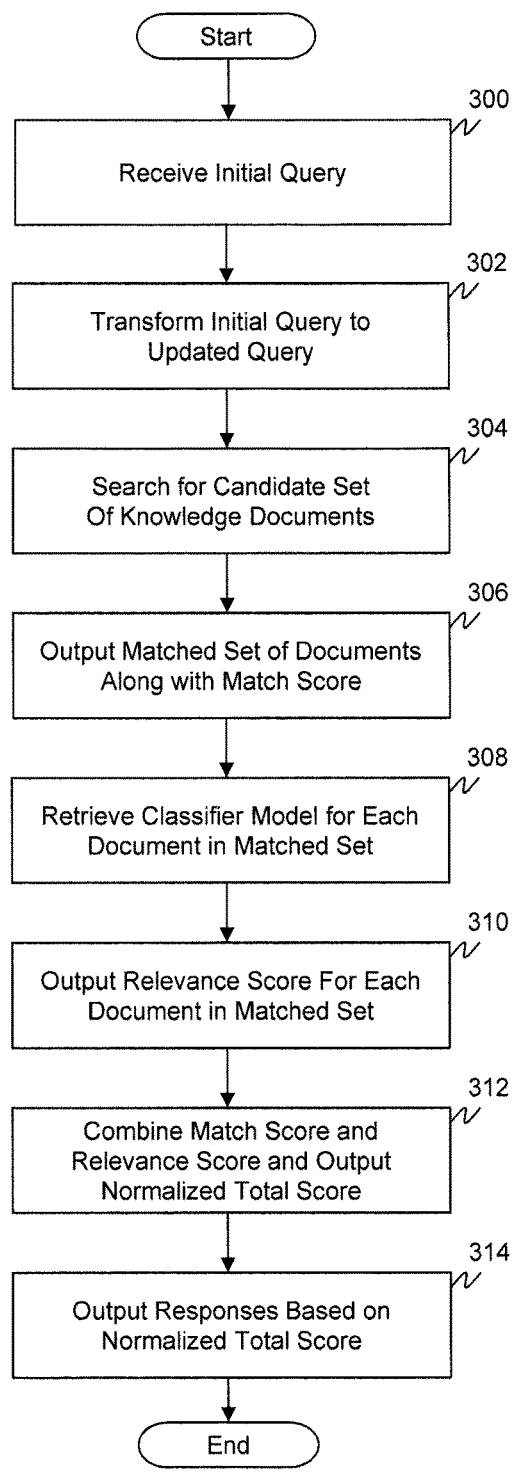
FIG. 4 is a flow diagram of a process for proactively making knowledge offers according to one embodiment of the invention.

FIG. 4 is a flow diagram of a process for proactively making, knowledge offers according to one embodiment of the invention. In act 300, the preprocessing module 200 receives an initial query from the web monitoring module 18 or the agent device 28. The initial query may include text typed by the user in certain monitored sections of a web page or agent GUI. A monitored section may be a search box, fillable email form, chat box, or the like. After the user has typed a certain amount of text, the web monitoring module anticipates need of the user relating to the topic input so far, and submits the text as the initial query, even before the user selects an option to expressly submit the query. In another embodiment, the web monitoring module waits until the user submits a "search" command prior to submitting the initial query.

According to one embodiment, the web monitoring module 18 correlates the content of the text with context surrounding the typing of the text, and submits the context information as part of the initial query. In one embodiment, an initial query with just context data may be generated based on assumed user intent even if the user has not typed any text. In this regard, the web monitoring module 18 may anticipates the user's need for knowledge based on interactions with the website, and proactively generates and submits the initial query to allow early suggestions of knowledge that may be ultimately desired by the user.

The context information provided by the web monitoring module 18 may relate to content of the visited website, navigation path, the user's profile, and the like. For example, if the web monitoring module 18 detects that a user is lingering longer than average on a particular portion of a web page, such as, for example, a portion of the web page displaying information on the newest iPhone to be released, the web monitoring module may deduce user intent that is related to the subject matter displayed on the particular portion of the web page. For example, the web monitoring module may be configured to deduce that the user is interested in the new iPhone. According to one embodiment the web monitoring module 18 may retrieve and transmit tag data associated with the particular portion of the web site as the initial query. Other context information may also be transmitted as part of the initial query, such as, for example, the amount of time in which the user was lingering, information on other pages visited by the user prior to lingering on the current page, the navigation path taken by the user to reach the current page user identification information (if the user is logged in), and the like.

In act 302, the preprocessing module 200 transforms the initial query into an updated query with terms that are useful in discriminating user intent. The processing of the initial query may involve, for example, tokenization, Part-Of-Speech (PUS) tagging, lemmatization, and/or stop word removal. As a person skill in the art will understand, PUS tagging extracts terms that are nouns, verbs, or adjectives, as the relevant terms in the text which discriminate the user's true intention. After the relevant terms are identified, the preprocessing module 200 may be configured to expand each term with top-N similar words obtained, for example, from a library of synonyms accessible to the module. Of course, any other preprocessing mechanism conventional in the art may be used in addition or in lieu of the mechanisms mentioned herein, to generate an updated query that contain terms that identify user intent.

According to one embodiment, as part of query processing and expansion, the preprocessing module 200 may be configured to interact with the contact center system 14 and other information sources 22 to retrieve information relevant to user intent. For example, assume that the initial query sent by the web monitoring module relates to the new iPhone 6. The preprocessing module may, upon retrieving information on past interactions with the contact center system 14, or based on analysis of posting on the user's social media site, understand that the user has been having problems with his WiFi. The preprocessing module may anticipate that the user needs help in setting up the WiFi for his new iPhone 6, and generate an updated/expanded query that includes the terms "iPhone 6," "WiFi," and "setup," The terms "WiFi" and "setup" may be retrieved, for example, from a summary of a recent interaction with the customer which is generated by the agent upon completion of the interaction and stored as part of the user's interaction history. In another example, information on past interaction history and/or user profile information may help further determine intent of an initial query as relating to sales or a complaint. For example, if the user information indicates that be does not own an iPhone 6, the initial query may be interpreted as the user being interested in purchasing the new iPhone 6, as opposed to being a query for lodging a complaint about the new iPhone 6.

The updated query is transmitted to the match scoring module 202, in act 304, to search for a candidate set of knowledge documents that match the transformed query. According to one embodiment, each knowledge document includes a question and an answer to the question. Relevant terms found in the question and answer portions are respectively stored in question and answer fields associated with each document According to one embodiment, question and answer vectors are generated based on respectively the question and answer fields by applying the same transform that is applied in act 302 to transform queries. According to one embodiment, the document also stores in a feedback field, terms that are not part of the original document, but that are present in the query for which the document was tagged as relevant during user feedback. A feedback vector may also be generated in response.

According to one embodiment, the match scoring module computes match scores for the documents in the mass storage device 20 by conducting a similarity search of the query over the question, answer, and feedback vectors corresponding to the documents. According to one embodiment, one or more query terms may be given a higher weight that other query terms for conducting the similarity search. For example, if a user is having problems with connecting a printer to a wireless router, using specific technical terms could indicate that the user has advanced knowledge on the RI object, and already tried common troubleshooting steps. In this example, the technical terms could be given higher weight that some other terms of the query, to cause a more detailed knowledge document on the topic to be retrieved than a basic knowledge document on the same topic.

The matching documents are then ranked according to their match scores. According to one embodiment, a ranking function such as, for example, Okapi BM25, may be used to rank matching documents according to their relevance to the updated query.

In act 306, the match scoring module 202 outputs, up to an upper limit, the matched set of documents along with their corresponding match scores.

In act 308, the query relevance scoring module 204 receives the candidate set of matching documents from the matching scoring module 202 and retrieves a classifier model for each document in the candidate set. According to one embodiment, online logistic regression (OLR), as will be understood by a person of skill in the art, is used as a per-document binary classifier. The per-document classification is based on feedback received from users after the document is output as suggested knowledge in response to a generated query. According to one embodiment, the feedback is a binary feedback indicating a particular suggested document was useful or not. If the document is tagged as relevant, the query relevance scoring module 204 (or some other classification module) adds the query that resulted in the document from being suggested, as a positive sample for the classifier for the document. Similarly, if the document is tagged as not being relevant, the query relevance scoring module 204 (or some other classification module) adds the query as a negative sample for the classifier for the document. In this manner, the per-document classifier provides the probability of the current query being relevant for a document, given the past queries for which the document was found to be relevant or non-relevant.

According to one embodiment, for positive feedbacks only, any new terms of the query not already part of the document are added into the feedback field for the document, and used for scoring matching documents by the match scoring module 202.

According to one embodiment, user feedbacks are provided different weights. Weights may be implemented by submitting repeated feedback in different volumes. In one embodiment, express feedbacks are given higher weight than implied feedbacks. Weights may also depend on the user providing, the feedback. For example, agent feedbacks may be given more weight than customer feedbacks.

According to one embodiment, implied feedbacks are assumed based on particular action or inaction by a user. For example, a negative feedback may be implied for unselected documents that are ranked higher than a document that was selected by the user. A positive feedback may be assumed for a document selected by a user if sufficient time was spent reviewing the document, the user referenced the document in a post, the user linked to the document, the user printed the document, the user emailed the document, and the like. In another example, if the user while typing a query request or filling out an email form is presented with a knowledge article, the user's selection of a suggested knowledge article in conjunction with the user terminating the current session without expressly submitting the search query or the email form, may be interpreted as a positive feedback for the selected article. On the other hand, if the user, after receiving the suggested knowledge article submits the query anyway, or if the query was already submitted, the user initiates a new query or requests contact with a contact center agent, such actions may be interpreted, as negative feedback for the suggested knowledge document.

According to one embodiment, feedbacks are weighted based on reputation of the users providing the feedback. Such reputation data may be retrieved from reputation management systems such as Badgeville or Bunchball.

In embodiments where agents receive suggestions of knowledge documents while interacting with a customer, customer sentiment/satisfaction at the end of the interaction may be used to implicitly determine relevance of the document. For example, a high (or low) customer satisfaction after using the document may be used to imply a positive for negative) feedback for the document that was used. According to one embodiment, customer profile information may be used in determining, the weight of the feedback to be implied based on the customer satisfaction information. Thus, an advanced approach correlates knowledge with customer profile, rather titan applying global metrics only.

In act 310, the query relevance scoring module outputs a relevance score for each candidate document based on retrieved classifier model for the document. In this regard, the query relevance scoring module 204 translates the updated query into a feature space for the retrieved model by vectorizing the updated query. According to one embodiment, feature hashing, as will be understood by a person of skill in the art, is used for translating, the updated query into the feature space for the classifier model. A relevance score is then assigned to the document for indicating a probability that the document will be relevant to the updated query based on the model.

In act 312, the score combination module 205 takes, for each candidate document, the match score output by the match scoring module 202 and the relevance score output by the query relevance scoring module 204, and generates a combined score that is a function for the two scores. The combined score may be normalized to be within a fixed interval range like [0.0, 1.0], According to one embodiment, the normalized score is treated as a value that reflects confidence that the knowledge document is relevant to the deduced user intent.

In act 314, the documents are ranked by score and output as ranked results 212. In this regard, documents that have confidence (a combined score) less than a preset confidence level are dropped from the result set. According to one embodiment, links to the documents from the result set are displayed by the web server (e.g. as a pop-up page) as suggested knowledge articles. The actual text of the documents may be viewed upon selection of the links.

According to one embodiment, the presentation of the suggested knowledge may depend on feedback received from users, preference of the users, and/or other user profile data. Different presentations may be available for a particular document where each presentation differs in the way that the document is worded. For example, one presentation option may present the document in a compact manner with simple words, while another presentation option may present the document in a verbose manner with technical terms. The type of presentation option to use for a particular document may depend on the popularity of the presentation option (e.g. measured based on clicks for documents presented according to the presentation option). The type of presentation option to use may also depend on the profile of the user, such as, for example, the education level of the user.

A person of skill in the art should appreciate that the two-level search algorithm discussed with respect to FIG. 4 may be used outside of proactive engagement/knowledge offers.

For example, the algorithm may apply to the following areas for interaction optimization:

agent routing—where analysis of inbound interactions map to a query, and models of agent skills, manually specified and/or learned, map to the document representing the agent;

agent assistance—where implicit search from interactions, or explicit searches from agents, drive search against a corpus of prior interactions, or knowledge articles;

offer-recommendation—where event and text-based interaction inputs can be applied for offer selection.

In using the search algorithm for agent routing, the documents may be documents representing skills of an agent. The per-document classifier is thus a classifier of the agent skills for each agent. Feedback in this instance may be based on data relating to the handling of the interaction, such as, for example, outcome of the interaction, customer satisfaction, and the like.

According to one embodiment, contact center infrastructure may be used for enterprise knowledge management. In this regard, an enterprise user looking for certain knowledge might be served by different output mechanisms that provide the knowledge, such as, for example, via explicit direct answer, list of related documents, list of employees with knowledge about the subject, references to related enterprise projects, list of external experts, references to related training courses, video, and/or the like. The user's inquiry may be submitted through various media, including, for example, e.g. web search portal, voice (calling a reserved knowledge number), chat, enterprise social (e.g., the enterprise's Twitter or Facebook page), email (to knowledge alias), and the like. A query is generated based on the inquiry as described above. A voice-to-text processing device may be invoked, for inquiries that are initially provided as voice.

According to one embodiment, the knowledge management system receiving the inquiry is configured to determine how to respond to the inquiry, including when to respond as well as the media channel to invoke. For example, the knowledge response may be immediate or deferred, through same media channel or different one (e.g. voice inquiry answered by email), and the like. In this regard, the knowledge management system, or some other server of the contact center system in communication with the knowledge management system (e.g. iXn server 122), may include an engine for intake, prioritization, routing, selection of appropriate response channel, and the like. Such determinations may be based, for example, on rules that are invoked, for example, based on information gathered on interactions between the user and resources of the contact center. For example, customer profile data, business objectives, subject matter of the inquiry, medium for transmitting the inquiry, and the like, may be used for selecting the appropriate rules.

According, to one embodiment, if a knowledge request is deemed to require a real-time response based on the invoked rule, information on presence availability of the agents to answer questions in real time may be used for selecting agents to which the request is to be routed. If the knowledge request is deemed to be fit for a deferred response, the iXn server 122 may be invoked for categorization and prioritization of the knowledge request for generating a deferred task that is routed to an appropriate contact center agent.

Figure 5:
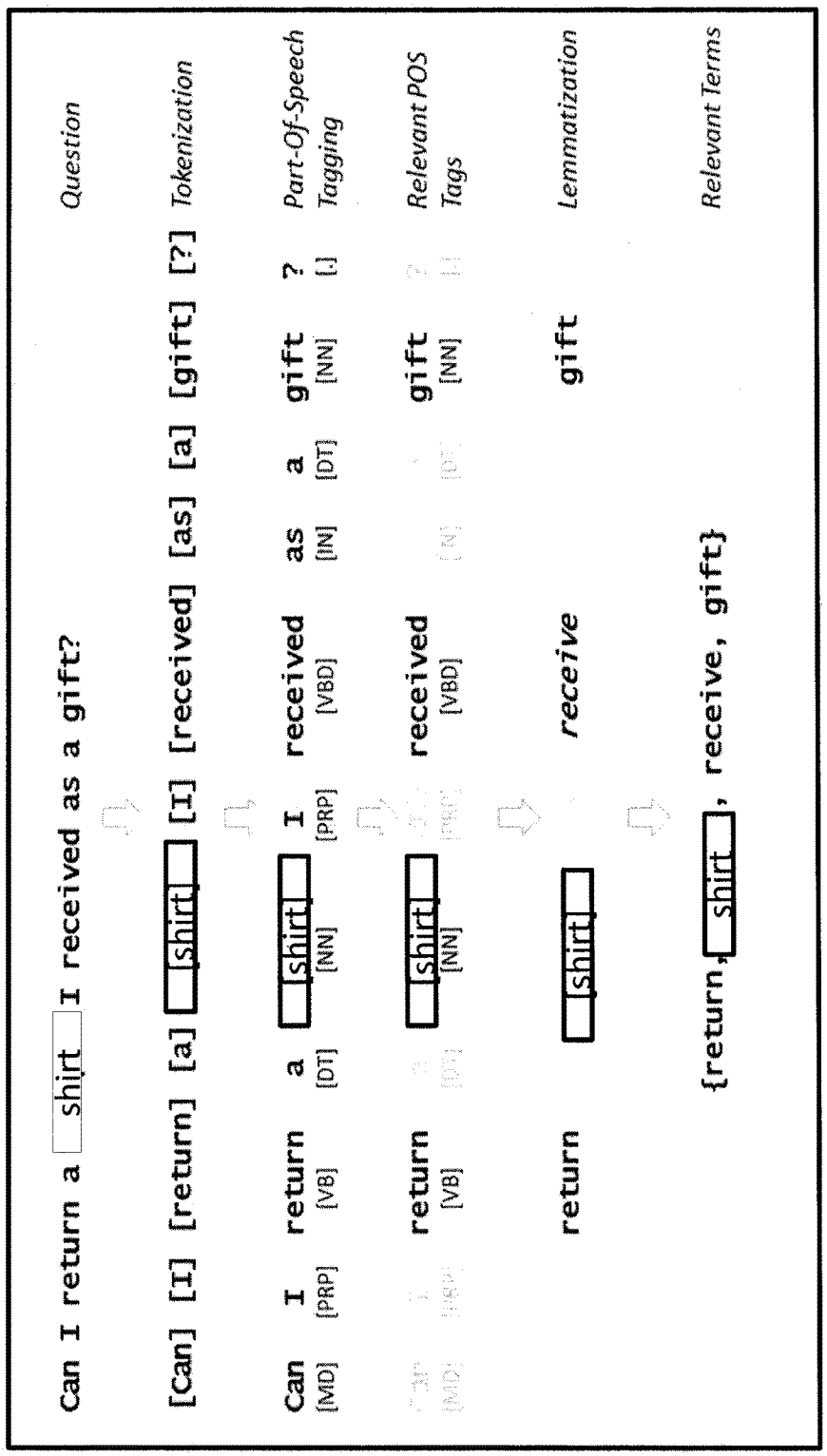
FIG. 5 is a conceptual layout diagram of a step for preprocessing an initial query according to one exemplary embodiment of the invention.

FIG. 5 is a conceptual layout diagram of a step for preprocessing an initial query according to one exemplary embodiment of the invention. In this example, the initial query is: "Can I return a shirt I received as a gift?" After tokenization, part-of-speech tagging, and lemmatization, the updated query includes the terms "return, shirt, receive, gift."

FIG. 6A is a conceptual layout diagram of an exemplary FAQ document that may be stored as a knowledge article in the mass storage device 20 according to one embodiment of the invention. The document includes a preferred query 400 as well as an answer 402 that is responsive to the query.

FIG. 6B is a conceptual layout diagram of terms that are extracted from a knowledge document based on a preprocessing step which may be similar to the preprocessing step conducted for input queries. According to one embodiment, the terms are stored in question and answer fields. Although not shown in this example, a separate feedback field may also be maintained which includes terms extracted from queries to which the document was given a positive feedback.

Figure 7B:
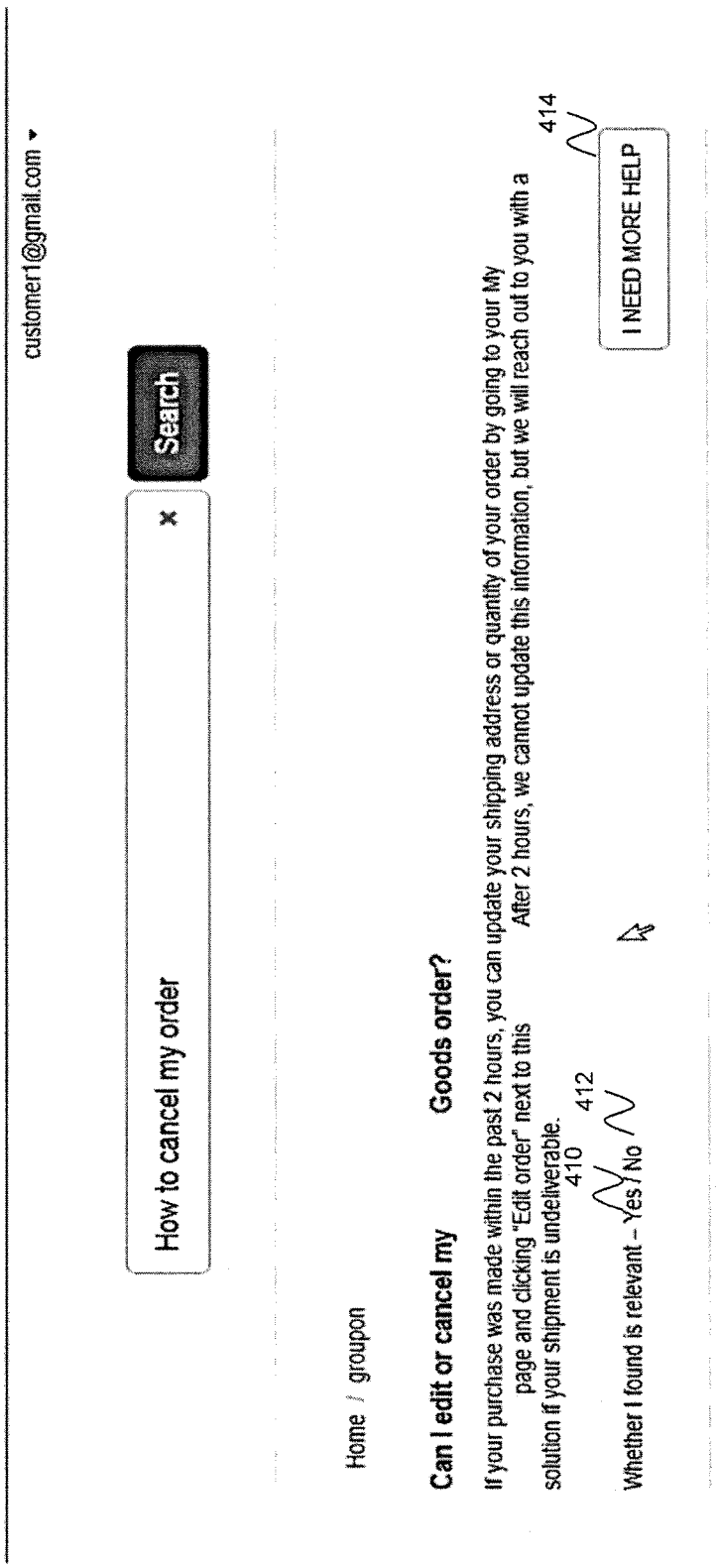

FIGS. 7A-7B are screen shots of a web page providing access to the knowledge management system to a visitor of the website according to one embodiment of the invention. As seen in FIG. 7A, the web page includes a search box 400 where a user may enter a natural language query relating, to a topic of interest. According to one embodiment, the user types the query and selects a search command 402 to retrieve a set of most relevant knowledge documents 404a-404c selected based on the process described with respect to FIG. 4. The relevant knowledge documents may also be proactively offered as the user types the query, but before the user actuates the search command 402, and/or based on interactions with the website and surrounding context information.

According to one embodiment, the knowledge documents are displayed according to the combined score given to each document, with the highest ranking document appearing first. Selection of one of the suggested knowledge documents by, fir example, selecting a "more" option 406, causes display of the full answer to the query as depicted in FIG. 7B. According to one embodiment, the user may provide express feedback on whether the document was relevant (helpful) in satisfying the user's need by actuating a positive or negative feedback option 410, 412. The user may always escalate to an agent by transmitting a request for interaction by actuating an interaction option 414.

According to one embodiment, a user transmitting, a request for interaction by actuating the interaction option 414 is routed to an agent of the contact center. The routing strategy that is invoked, to route the interaction may take into account the query typed and/or submitted by the user prior to invoking the interaction option 414. For example, the content of the query, after having undergone preprocessing, may be used to find an agent with skills that match the content. An agent who has answered the question previously may be identified as having skills that match the query. Such an agent may be selected for routing the interaction to the agent.

Figure 8A:
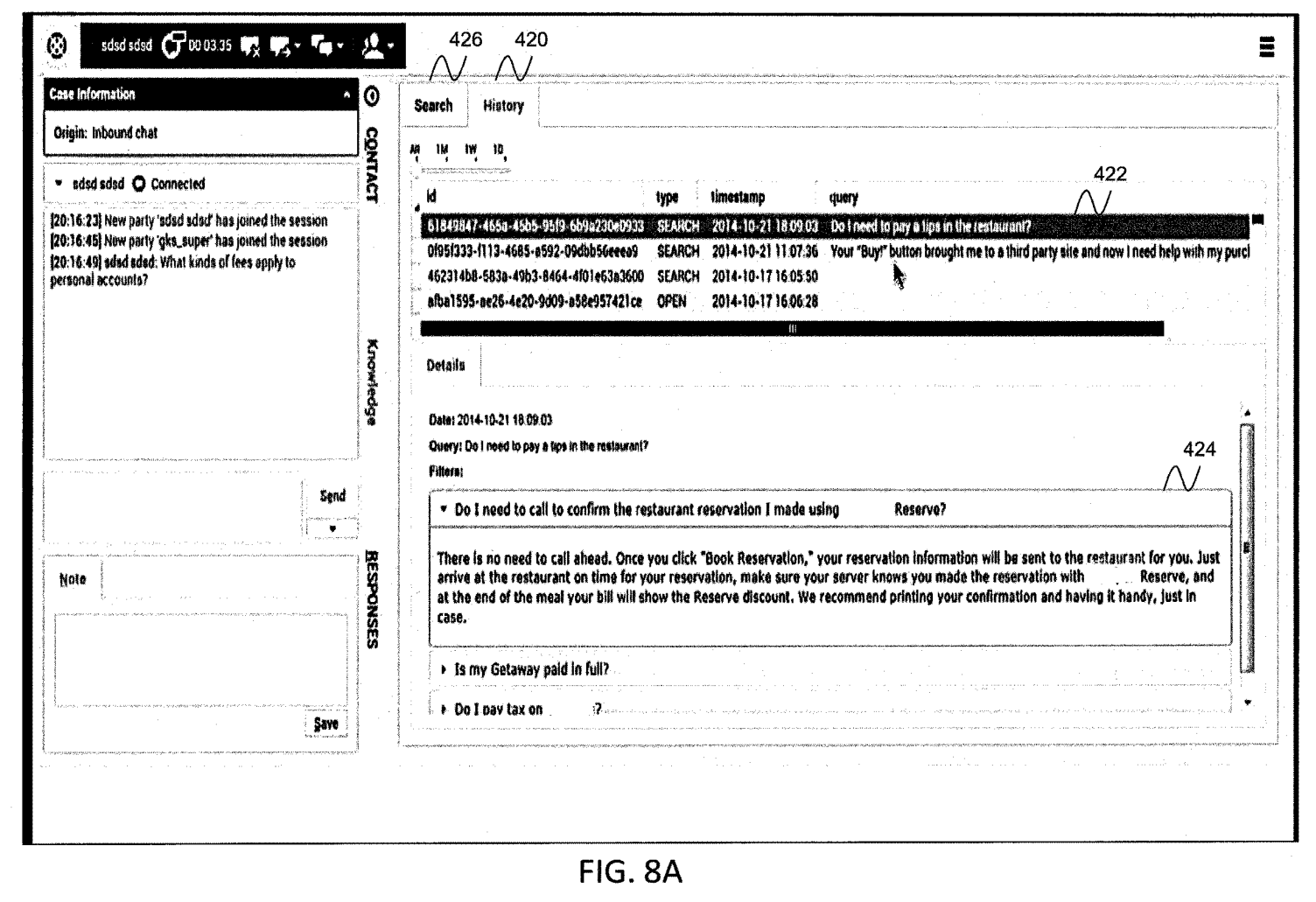
Figure 8B:
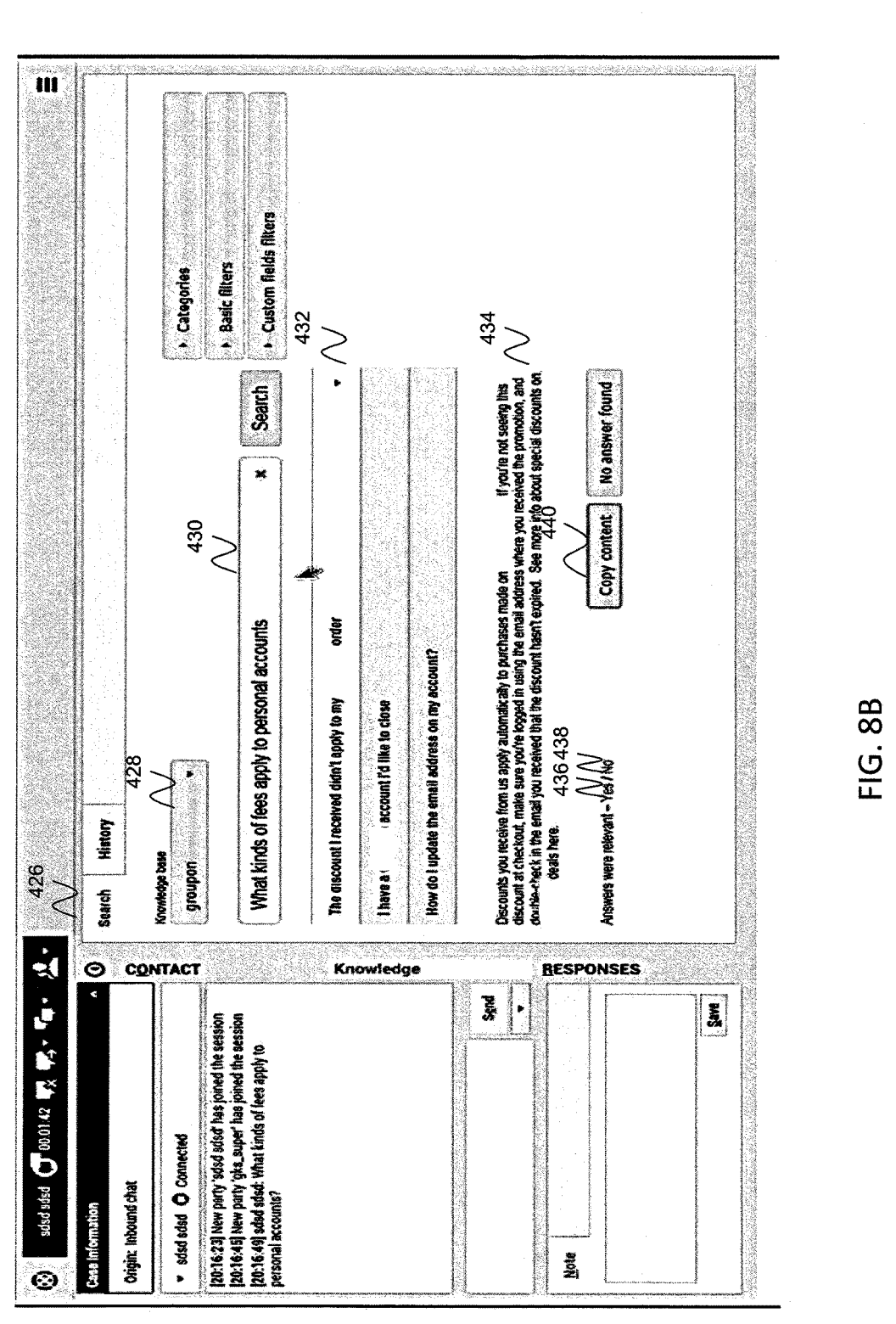

FIGS. 8A-8B are screen shots of an agent GUI that may be invoked during an interaction with a customer according to one embodiment of the invention. The agent GUI includes a history tab 420 for displaying a history of queries submitted by a user. Selection of a particular query 422 causes display of details pertaining to the query, such as, for example, a list of knowledge documents 424 that were suggested to the user in response to the query. Such information helps the agent get a better understanding of the intent of the user in requesting the interaction with the agent.

According to one embodiment, the agent may also conduct searches of the knowledge base h selecting a search tab 426. The search tab causes display of a search interface that allows the user to select a particular knowledge base 428 that be is interested in searching. An initial search term is typed in a search box 430, and relevant knowledge documents are retrieved according to the process described with respect to FIG. 4. The documents are then displayed in a results area 432 in an order of relevance. Selection of a suggested knowledge document causes the full text of the document to be displayed in area 434. The agent may provide express feedback of the relevancy of the document to his query by actuating options 436, 438. According to one embodiment, the agent uses the text of the knowledge document to assist the customer with whom the agent is interacting. In this regard, the agent actuates a "copy content" option 440 to use the text of the document in, for example, a response email or chat response back to the customer.

Figure 9:
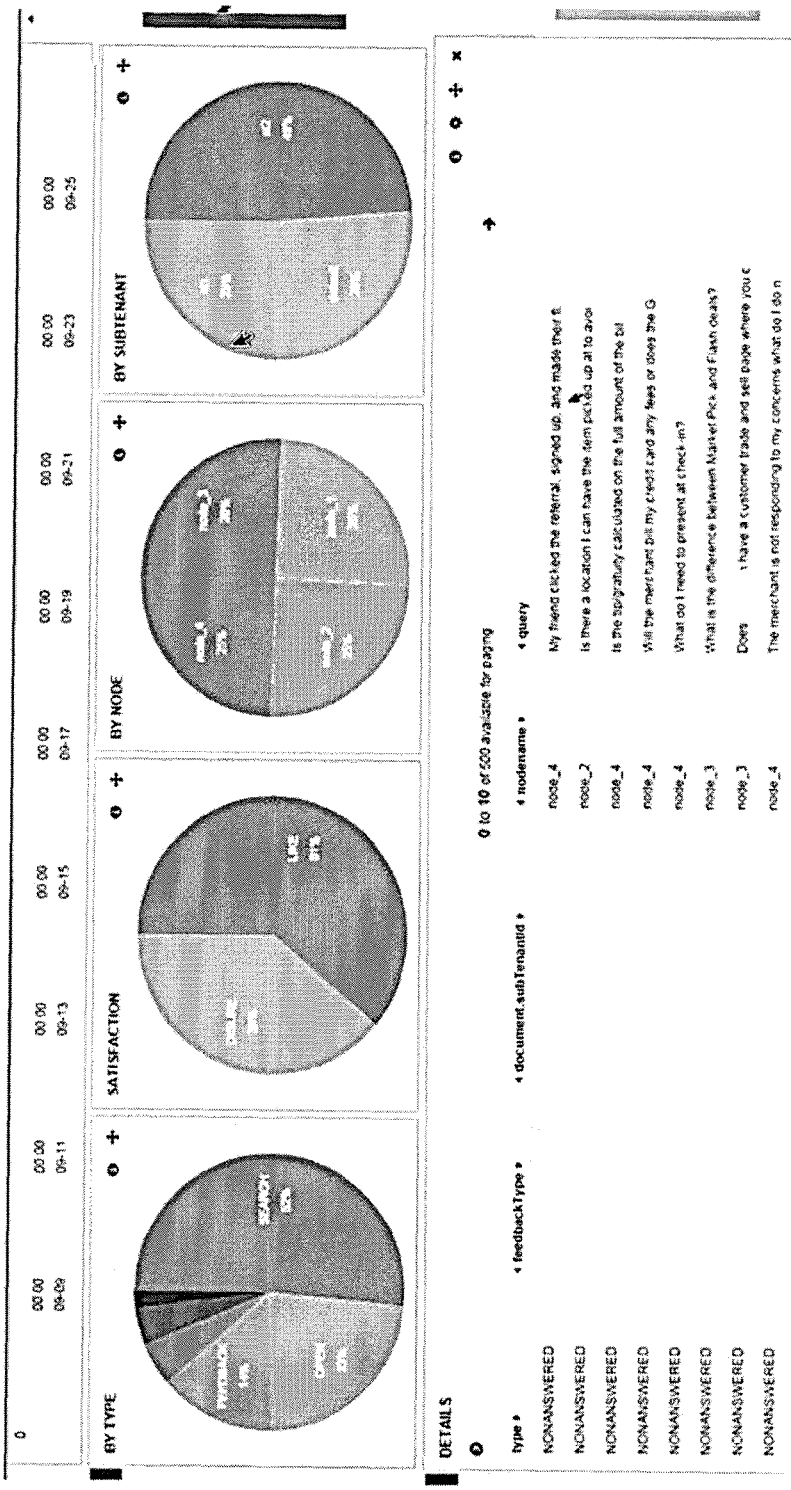
FIG. 9 is a screen shot of a reporting screen depicting performance of the knowledge documents.

FIG. 9 is a screen shot of a reporting screen depicting performance of the knowledge documents. The report may provide information as to how many documents received feedback, what the feedback was like, and the like. A list of unanswered questions may also be tracked and a task may be generated for a knowledge worker to review and handle. For example, if the question did not have an answer, the knowledge worker may generate an answer and store it in the mass storage device 20. If, however, a question is unanswered because the question was not recognized, the question may be added as an alternate question to a corresponding question that is recognized.

II. Making Engagement Offers Based on Observed Navigation Path

Embodiments of the present invention are also directed to determining user intent as the user navigates pages of the enterprises website for making engagement offers to the user. According to one embodiment, the web monitoring module keeps track of interactions with the website, including the navigation path of the user as the user browses the website. The web monitoring, module further keeps track of engagement offers made to the user during, the current browsing session, including information on whether the offer for engagement was accepted, rejected, or ignored.

By observing navigation behavior of users and results of engagement offers made to those users, the web monitoring module may correlate the navigation behaviors to user intent. For example, the web monitoring module may deduce, based on observations made so far, that customers navigating a particular way (e.g. P7, P11, P1, P23, P4, P71) where P7 is a starting web page and P71 is an ending web page, have an intent related to subject A hence, have a high likelihood of accepting an engagement offer relating to subject A. If a user follows the observed navigation path but has not yet reached the end of the navigation path (e.g., has not yet reached P71), an engagement offer relating to subject A may still be made at a point prior to P71 based on confidence that the customer is indeed interested in subject A. Confidence may be based on various factors including the probability that the user will indeed continue on the path and other context data other than navigation path such as, for example, the range of topics associated with the particular page, user profile data, and the like. One benefit of deducing user intent as soon as possible to make engagement offers sooner than later is that it helps to provide earlier satisfaction of user need. If the offer for engagement is a knowledge document that may allow the user to engage in self-help, the early offer of such knowledge document may help deflect calls to the contact center. At the same time, it is desirable to monitor the user behavior long enough to predict his intent more precisely. Thus, according to one embodiment, a knowledge offer is not made unless there is a threshold level of confidence that the user intent has been deduced.

According, to one embodiment, in addition or in lieu of making the engagement offers, the web monitoring module 18 may interface with the contact center system 14 to prepare for a likely engagement by making agent selection, retrieving interaction history for the user, determining a business strategy (matching offerings, eligibility, cross-flip-sell, etc.), and the like.

According to one embodiment, one or more intent tags are maintained for each web page for calculating confidence of a user's intent. Unlike static metadata that is used to describe attributes of the web page, intent tags according to embodiments of the present invention are dynamic and may be updated based on the monitored user interactions. According, to one embodiment, the intent tags may be maintained in association with the web page without, for example, modifying the actual web page itself.

Figure 10:
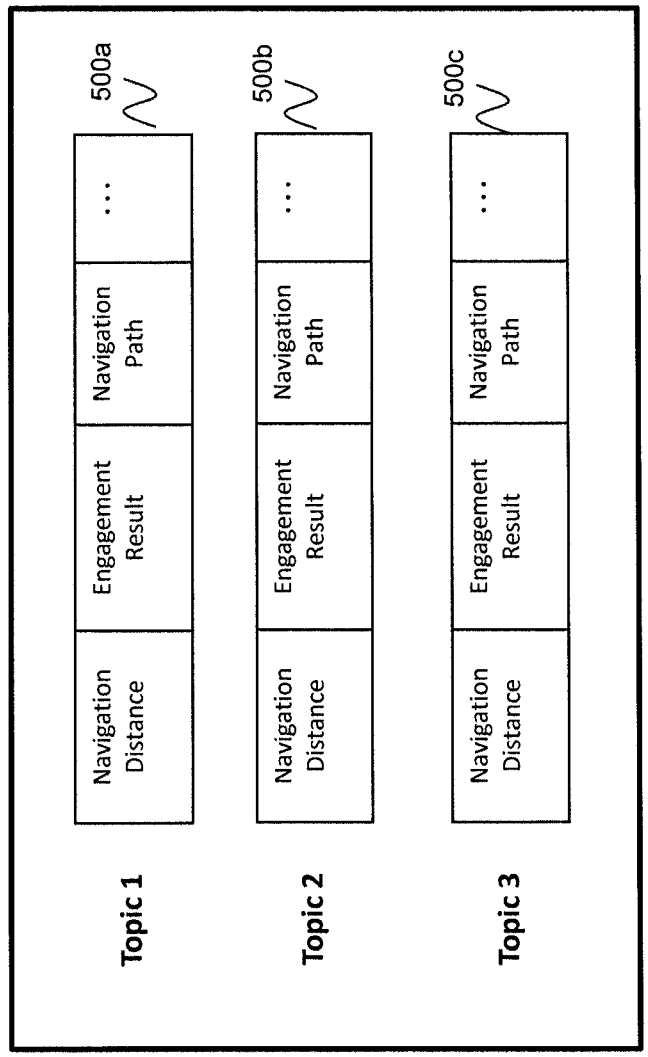
FIG. 10 is a layout diagram of exemplary intent tags that may be maintained for a particular web page.

FIG. 10 is a layout diagram of exemplary intent tags 500a-500c (collectively referenced as 500) that may be maintained for a particular web page. According to one embodiment, the intent tags 500 may be associated with a particular intent topic (e.g. mortgage contract buying a camera, etc.) and/or content of the web page. If a particular web page is associated with multiple topics, separate intent tags may be maintained for each topic.

Each intent tag 500 may include values/weights for different tag elements such as, for example, navigation distance and engagement result. The navigation distance is a number of steps on a particular navigation path that have to be taken in order to reach a web page where engagement was offered. The engagement result identifies whether the engagement at that page was accepted, rejected, or ignored. The intent tag may further identify a particular navigation path to the current web page.

According to one embodiment, the web monitoring module 18 dynamically updates the weights of the tag elements based on observations. For example, assume that an observed navigation path for a particular web page is as follows: (P7, P11, P1, P23, P4, P71), where P7 is a page were observed browsing started, and P71 is a last page where browsing ended. Assume that an engagement offer related to a particular user intent is made on P71, and the offer is accepted. The intent tag for P71 for this observed navigation path is updated by the web monitoring module to indicate a navigation distance of 0 (since this is the page in which the engagement offer was made), and to indicate an engagement result of 1 (since the engagement offer was accepted). If P71 is associated with more than one topic, the true topic of interest to the user may be identified during an actual interaction with the user. The tag for that topic of interest is then modified with the navigation distance and engagement result.

The tag for P4, the web page just prior to reaching P71, may similarly be updated to reflect a navigation distance of −1 and engagement result of 1. The tag for P4 may also include statistics reflecting likelihood of following the given navigation path based on observed history. Such likelihood may be used to alter the confidence of the user's intent.

The tags of other web pages P23, P1, P11, and P7 are updated in a similar manner.

When the system is in production long enough, the tag (associated meaning and aggregated value) may be used for assessing, the likelihood of correctly determining the intent of a user at a particular web page. In this regard, the aggregated values/weights of a particular tag may be used for determining confidence that an engagement offered on the page will be accepted by the user. For example, a confidence value at each page may be calculated as a function of the weight provided by the associated tag, in the above example, the weights decrease the further the pages are on the navigation path from the page where the engagement offer was made and accepted. Thus, the weight of P23 is less than the weight of P4. Hence, according one embodiment, the confidence on page P23 for a particular user-intent is computed to be less than the confidence on page P4. According to one embodiment, the confidence value may be modified based on other context information as described herein.

According to one embodiment, the web engagement module 10 formulates rules for sending, engagement offers. The rules may be based on confidence computations based on the intent tags as described above. Other rules may also be formulated to work, for example, in conjunction with rules that are based on confidence computation. For example, the web monitoring module 18 may be configured to detect "negative" web pages with the lowest hit rate. A rule may thus be created that prevents engagement offers to be made when a customer is located on one of these pages regardless of the confidence value. Similarly, the web monitoring module 18 may be configured to detect "positive" web pages with the highest hit rate. A rule may thus be created that causes the web monitoring module to send engagement offers if a customer lands on such a web page regardless of the confidence value.

In another example, the web monitoring module may find dependency of the duration between opening a web page and positive/negative answer to an engagement offer. A rule may be generated based on such learned dependency.

Other data may also be considered in generating rules and/or computing confidence values. For example, a customer's profile (if known) may be used as a filter for determining, whether an offer for engagement will be made. For example, the customer's profile may indicate a likelihood that the user will continue on a particular navigation path. Running advertisements may impact weight given to a particular subject/topic. Past historical data such as, for example, the time of day, day of week, season, may also be used to determine confidence values.

The origin of the navigation, if known, may be considered in generating rules and/or computing confidence values. For example, the user might start the web session from another site external to the website provided by the enterprise. For example, the user may start the web session from his home page where the user may be searching for something (product, service, enterprise brand, etc.) using a preferred search engine. Selecting a link from the search results may redirect the user to the enterprise's landing page. There could be different landing pages for different topics, or a general enterprise home page. In another example, the user may navigate directly to a particular web page through a URI, provided to the user in, for example, an email, or auto-generated when scanning a product QR code or the like. The user may also navigate directly to a particular web page by typing the URL. Monitoring kicks in when the user lands on a web page of the enterprise. Knowing the user's navigation origin when arriving at the enterprise's web page may be helpful in deducing customer intent.

In another example, the enterprise may have a business relation with other commonly used web service companies, such as Google search, Amazon, eBay, Newegg, Yahoo, or the like. The web service companies may display the enterprise advertisements, including contact links. This could be either a direct engagement dialog, or a link to the enterprise site with a specific landing page. In the latter case, monitoring of user behavior starts after arrival at the enterprise landing page. The web server may provide dedicated landing pages for all available navigation possibilities, or the same landing pages for individual services regardless of where the user is navigating from. In any case, knowing how the user arrived at the landing site may help with intent determination and potentially faster engagement.

According to one embodiment, time spent by a user on the website or a particular web page may be considered in generating rules and/or computing confidence values. An analogy may be made to providing assistance to a customer in a food store. If the customer knows exactly what to buy, be does it quickly and decisively (e.g., be knows to buy milk, bread, meat, vegetables, fruits, and that's it). In this case the customer is shopping in a do-not-disturb mode, and may not accept an assistance offer. However, if the customer stays at a particular product for relatively long time, it is much more likely that the assistance will be accepted. A same approach may be applied in the web engagement scenario. The longer the user stays on the web site or on particular page, the higher probability to accept an engagement offer.

According to one embodiment, engagement offers are paced based on the calculated confidence levels. In this regard, a number of engagement offers that are sent to users at a particular point in time may be a function of the confidence level and availability of agents. For example, if at a particular point in time, 5 customers have navigated to a web page where the confidence level of deduced intent is 90%, and there are only 5 agents available to handle the interaction, the web engagement module may be configured to avoid sending engagement offers other than engagement offers to the 5 customers, in this case, there is no over-inviting of customers to prompt them to engage. If, however, there are 10 customers that have navigated to web pages where the confidence level is only 30%, additional invitations for engagement may be transmitted in addition to the invitations to the 10 customers. For example, invitations may be extended to customers landing on web pages with even a lower confidence level to give such customers the opportunity to accept the invitations. The number of over-invitation may depend on the confidence level associated with the other web pages.

Pacing may also be exercised in embodiments where the engagement offers relate to knowledge articles. In this scenario, over-invitation may be based on the calculated confidence level. Since showing off-topic answers fast will be likely annoying and counter-productive, the over-invitations may be carried out for situations where confidence is above a certain threshold.

According to one embodiment, if the offer for engagement is a knowledge article, the identification of such knowledge article may be based on a query that is generated by the web monitoring module based on the monitored user interaction. The query may include, for example, the deduced topic/intent, along with surrounding context data as discussed above.

Each of the various servers, controllers, switches, gateways, engines, and/or modules (collectively referred to as servers) in the afore-described figures may be a process or thread, running on one or more processors, in one or more computing devices 1500 (e.g., FIG. 11A, FIG. 11B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater limit tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using, encoded in extensible markup language (XML) or JavaScript Object notation (JSON).

Figure 11A:
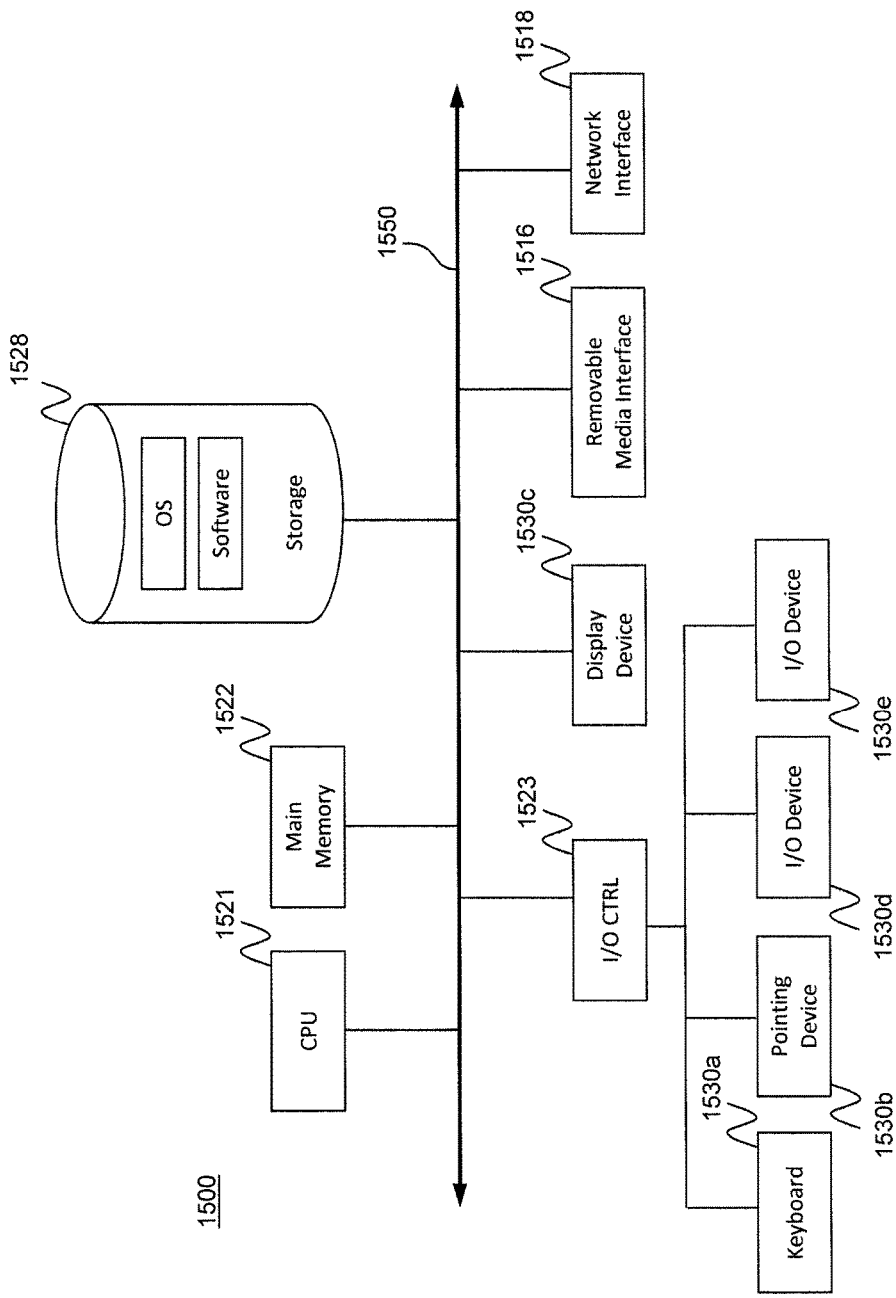
FIG. 11A is a block diagram of a computing device according to an embodiment of the present invention.

FIG. 11A and FIG. 11B depict block diagrams of a computing device 1500 as may be employed in exemplary embodiments of the present invention. Each computing device 1500 includes a central processing unit 1521 and a main memory unit 1522. As shown in FIG. 11A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 11B, each computing device 1501) may also include additional optional elements, such as a memory port 1503, a bridge 1570, one or more additional input/output devices 1530d, 1530e and a cache memory 1540 in communication with the central processing; unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 11A, the central processing unit 1521 communicates with the main memory 1522 via a system bus 1550. As shown in FIG. 11B, the central processing unit 1521 may also communicate directly with the main memory 1522 via a memory port 1503.

FIG. 11B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 11A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended industry Standard. Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP), FIG. 11B depicts an embodiment of a computer 1500 in which the central processing unit 1521 communicates directly with I/O device 1530e. FIG. 11B also depicts an embodiment in which local busses and direct communication are mixed the central processing unit 1521 communicates with I/O device 1530d using a local system bus 1550 while communicating with I/O device 1530c directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 11A, may control the I/O devices. The I/O controller may control one or more I/O devices such as a keyboard 1530a and a pointing device 1530b, e.g., a mouse or optical pen.

Referring again, to FIG. 11A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 11A and FIG. 11B may operate under the control of an operating system, which controls scheduling of tasks and access to system resources. The computing device 1500 may be running any operating system, any embedded operating system, any real-time operating system, any open source operating system, any proprietary operating system, ally operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (RDA), a smart phone, a digital audio player, or a portable media player. In some embodiments, the computing device 1500 comprises a combination of devices, such as a mobile phone combined with a digital audio player or portable media player.

Figure 11D:
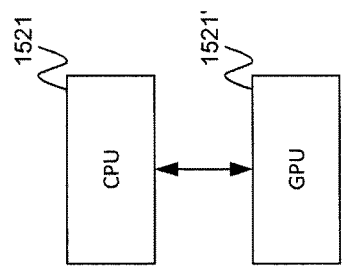
FIG. 11D is a block diagram of a computing device according to an embodiment of the present invention.
Figure 11C:
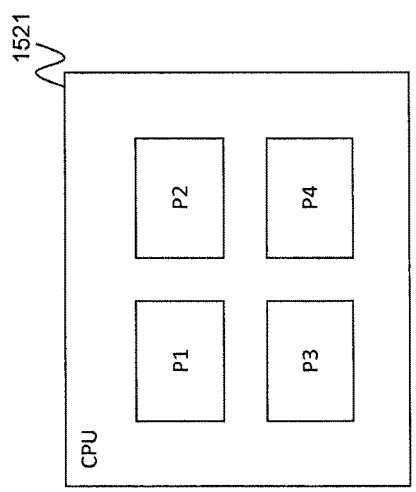
FIG. 11C is a block diagram of a computing device according to an embodiment of the present invention.

As shown in FIG. 11C the central processing, unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing, device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 11D, the computing device 1500 includes at least one central processing, unit 1521 and at least one graphics processing unit 1521.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD) in still other embodiments, the central processing unit 1521 may use any combination of SIMD and MIMD cores in a single device.

Figure 11E:
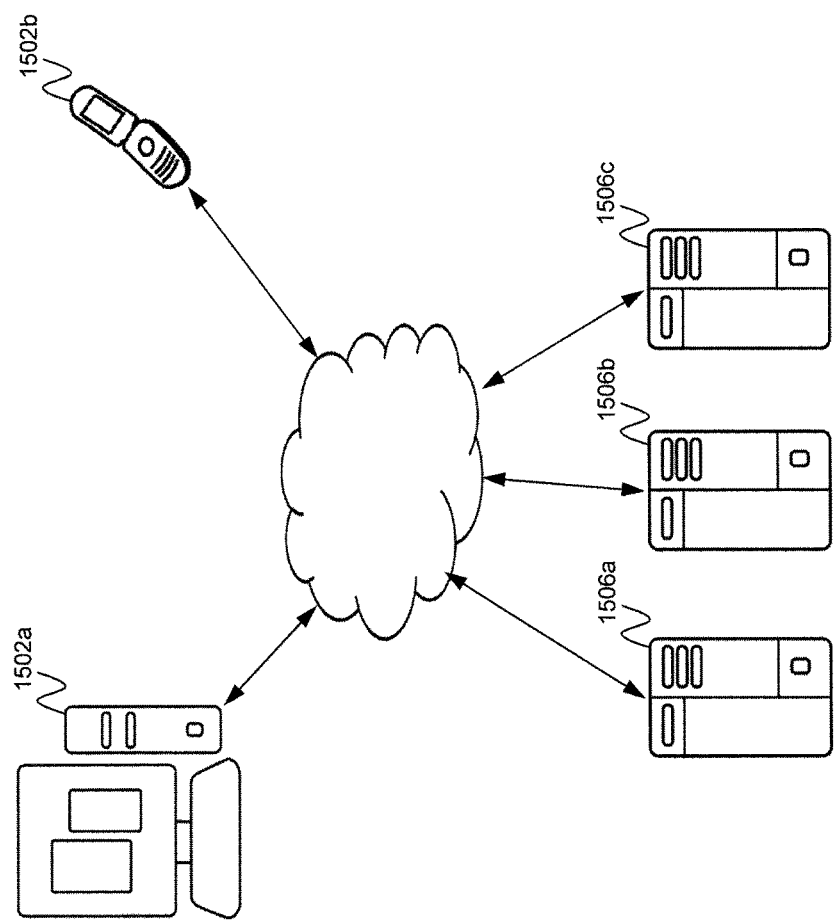
FIG. 11E is a block diagram of a network environment including several computing devices according, to an embodiment of the present invention.

A computing device may be one of a plurality of machines connected by a network, or it may comprise a plurality of machines so connected. FIG. 11E shows an exemplary network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 11E, there may, in general, be an arbitrary number of each. The network 1504 may be a local-area network (LAN), e.g., a private network such as a company Intranet, a metropolitan area network (MAN), or a wide area network (WAN), such as the Internet, or another public, network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 11E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

It is the Applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by claims and their equivalents rather than the foregoing description.

The invention claimed is:

1. A method for proactively making a knowledge offer comprising:
   gathering, by a processor, information on interactions by a user with resources provided by an enterprise having a customer contact center;
   anticipating, by the processor, need of the user based on the gathered information;

generating a search query based on the anticipated need, wherein the generating of the query includes receiving a first query and transforming the first query to a second query;

prior to the user expressly requesting knowledge relating to a particular topic, proactively identifying and suggesting the knowledge to the user, by the processor, based on the generated search query, wherein the proactively identifying and suggesting the knowledge further includes:

retrieving a classifier model for the knowledge;

determining a relevance score based on the classifier model, wherein the relevance score is indicative of a probability that the search query is relevant to the knowledge; and outputting the suggested knowledge based on the relevance score;

receiving, by the processor, feedback relating to the suggested knowledge;

updating, based on the feedback, the relevance score for the suggested knowledge; and adding, by the processor, the search query as one of a positive sample or a negative sample for the classifier model, based on the feedback.

2. The method of claim 1, wherein the resources include a website provided by the enterprise.

3. The method of claim 2, wherein the interaction is a query typed by the user.

4. The method of claim 1, wherein the resources include agents of the contact center.

5. The method of claim 1 wherein the interactions include past interactions.

6. The method of claim 1, wherein the anticipating the need of the user includes anticipating, by the processor, an express inquiry from the user.

7. The method of claim 6, wherein the information includes context of the interactions.

8. The method of claim 7 wherein the classifier model includes query samples for which the particular document was tagged as being relevant or not relevant.

9. The method of claim 1, wherein the anticipating the need of the user includes anticipating user intent for a current interaction with one of the resources provided by the enterprise.

10. The method of claim 1 wherein the search query includes text retrieved from the gathered information.

11. The method of claim 1, wherein the generating of the search query includes:

identifying, by the processor, terms for describing the anticipated need.

12. The method of claim 1 further comprising:

conducting, by the processor, a first level search for a candidate set of knowledge documents based on the knowledge set, and outputting a first score for each of the documents in the candidate set;

conducting, by the processor, a second level search of the candidate set of knowledge documents for relevant documents, and outputting a second score for each of the documents in the candidate set, wherein the second score is the relevance score;

generating, by the processor, a third score as a function of the first and second scores: and outputting, by the processor, one or more of the documents in the candidate set based on the third score.

13. The method of claim 12, wherein the feedback is for the particular document, the method further comprising:

training, by the processor, the classifier model for the particular document based on the feedback.

14. The method of claim 1, wherein the feedback is an express indication by the use as to whether the suggested knowledge was helpful or not.

15. The method of claim 1, wherein the feedback is implied from actions by the user.

16. The method of claim 1, wherein the first query includes text input by a user, and the transforming of the query includes expanding the first query with additional text.

17. A system for proactively making a knowledge offer comprising:

processor; and memory, wherein the memory includes instructions that, when executed by the processor, cause the processor to:

gather information on interactions by a user with resources provided by an enterprise having a customer contact center;

anticipate need of the user based on the gathered information;

generate a search query based on the anticipated need, wherein the generating of the query includes receiving a first query and transforming the first query to a second query;

prior to the user expressly requesting knowledge relating to a particular topic, proactively identify and suggest the knowledge to the user based on the generated search query, wherein the instructions that cause the processor to proactively identify and suggest the knowledge further includes instructions that cause the processor to:

retrieve a classifier model for the knowledge;

determine a relevance score based on the classifier model, wherein the relevance score is indicative of a probability that the search query is relevant to the knowledge; and output the suggested knowledge based on the relevance score;

receive feedback relating to the suggested knowledge; and update, based on the feedback, the relevance score for the suggested knowledge; and adding, by the processor, the search query as one of a positive sample or a negative sample for the classifier model, based on the feedback.

* * * * *